(12) United States Patent  
Matthes et al.

(10) Patent No.: US 12,449,113 B2
(45) Date of Patent: Oct. 21, 2025

(54) MOVEABLE LIGHT FIXTURE

(71) Applicant: Bunk16 LLC, Denver, CO (US)

(72) Inventors: Rose Matthes, Denver, CO (US); Caroline Matthes, Denver, CO (US)

(73) Assignee: Bunk16 LLC, Denver, CO (US)

( * ) Notice: Subject to any disclaimer, the term of this patent is extended or adjusted under 35 U.S.C. 154(b) by 0 days.

(21) Appl. No.: 18/900,393

(22) Filed: Sep. 27, 2024

(65) Prior Publication Data

US 2025/0109840 A1 Apr. 3, 2025

Related U.S. Application Data

(60) Provisional application No. 63/667,594, filed on Jul. 3, 2024, provisional application No. 63/541,131, filed on Sep. 28, 2023.

(51) Int. Cl.
*F21V 21/08* (2006.01)
*F21S 8/00* (2006.01)
(Continued)

(52) U.S. Cl.
CPC .......... *F21V 21/0808* (2013.01); *F21S 8/033* (2013.01); *F21S 9/02* (2013.01); *F21V 21/02* (2013.01);
(Continued)

(58) Field of Classification Search
CPC .... F21V 21/0808; F21V 21/02; F21V 21/108; F21S 8/033; F21S 9/02; F21L 4/08; F21L 4/085
See application file for complete search history.

(56) References Cited

U.S. PATENT DOCUMENTS

D261,559 S   10/1981  Palka
5,275,366 A   1/1994  Simmons
(Continued)

FOREIGN PATENT DOCUMENTS

EP        1612476       1/2006
WO    WO 2016/176564 A1   11/2016

OTHER PUBLICATIONS

"Tococo E27 Nordic Modern Wall Lamp Iron Black Indoor Lighting," Amazon.com, Inc., First Available Dec. 24, 2022, 4 pages [retrieved online Jun. 14, 2024 from: www.amazon.com/TOCOCO-Lighting-Bedside-Bathroom-Industrial/dp/B0BR5DDPZ8?th=1].
(Continued)

*Primary Examiner* — Sean P Gramling
(74) *Attorney, Agent, or Firm* — Sheridan Ross P.C.

(57) ABSTRACT

A moveable light fixture includes a base with a housing and a plate, at least one adhesive strip, and a lighting element in a light shade. The plate may have a backside, a frontside, and a notch. The at least one adhesive strip may be attached to the backside of the plate, and a portion of the at least one adhesive strip may extend into the notch area for engagement, with an end of the at least one adhesive strip accessible via the frontside in the notch when the plate is attached to a wall for removal. A level may be placed in the plate for levelling the plate when mounting to a wall. A battery with circuitry optionally in communication with a controller may be configured to provide power to the moveable light fixture. The housing rotates onto the plate after installation of the plate on the wall.

19 Claims, 32 Drawing Sheets

(51) Int. Cl.
*F21S 9/02* (2006.01)
*F21V 21/02* (2006.01)
*F21V 21/108* (2006.01)
*F21V 23/06* (2006.01)
*H05B 47/175* (2020.01)
*H05B 47/19* (2020.01)

(52) U.S. Cl.
CPC ............ *F21V 21/108* (2013.01); *F21V 23/06* (2013.01); *H05B 47/19* (2020.01); *H05B 47/1965* (2024.01)

(56) References Cited

U.S. PATENT DOCUMENTS

| | | |
|---|---|---|
| 6,633,110 B2 | 10/2003 | McGuire |
| D588,296 S | 3/2009 | Sabermig |
| 8,011,801 B2 | 9/2011 | Mock |
| 8,289,814 B2 | 10/2012 | Chien |
| D697,249 S | 1/2014 | Pyle |
| 9,318,886 B1 | 4/2016 | Pate |
| D825,092 S | 8/2018 | Amato |
| 10,618,709 B1 | 4/2020 | Seiders et al. |
| D905,317 S | 12/2020 | Czarnocki |
| 11,085,616 B1 | 8/2021 | Cui |
| 11,262,054 B1 | 3/2022 | Melamed |
| D968,674 S | 11/2022 | Rindt |
| D975,907 S | 1/2023 | Huang |
| 11,644,186 B1 * | 5/2023 | Strawn ................ F21V 19/0045 362/382 |
| 11,703,196 B2 | 7/2023 | Fierman |
| D1,006,297 S | 11/2023 | Li |
| D1,052,784 S | 11/2024 | Matthes et al. |
| 2007/0257165 A1 | 11/2007 | Newbould et al. |
| 2013/0155684 A1 | 6/2013 | Chen |
| 2018/0042089 A1 | 2/2018 | Cho et al. |
| 2019/0145612 A1 | 5/2019 | Crosby |
| 2021/0088198 A1 | 3/2021 | Kaule |

OTHER PUBLICATIONS

Wearable Search "Poplight! Wall lighting for everyone," Youtube, Feb. 21, 2023, 2 pages [retrieved online Jun. 14, 2024 from: www.youtube.com/watch?v=sw2VfPBpSCg].

Invitation to Pay Additional Fees for International (PCT) Patent Application No. PCT/US2024/049078, dated Nov. 4, 2024 2 pages.

International Search Report and Written Opinion for International (PCT) Patent Application No. PCT/US2024/049078, dated Jan. 2, 2025 19 pages.

* cited by examiner

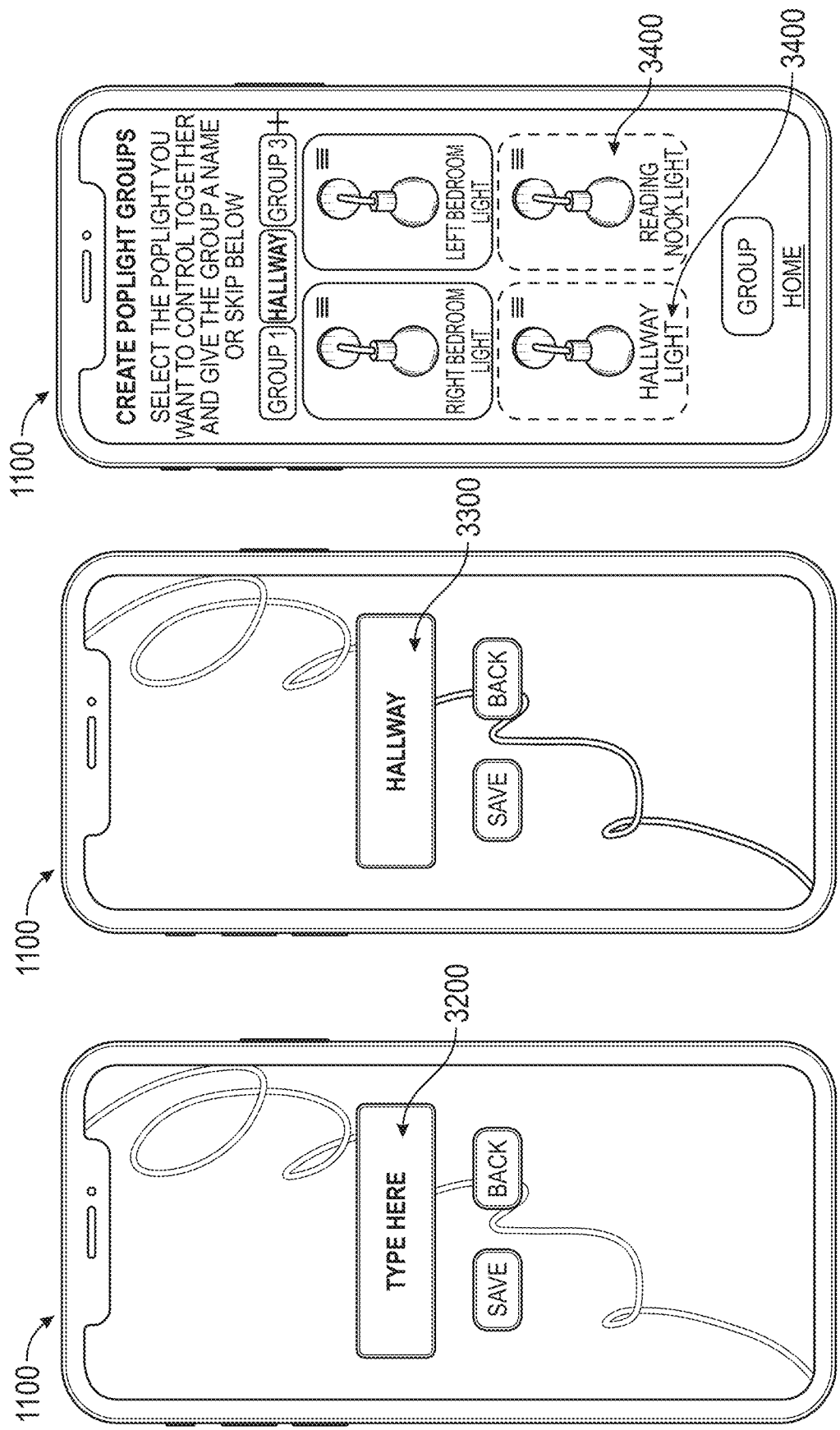

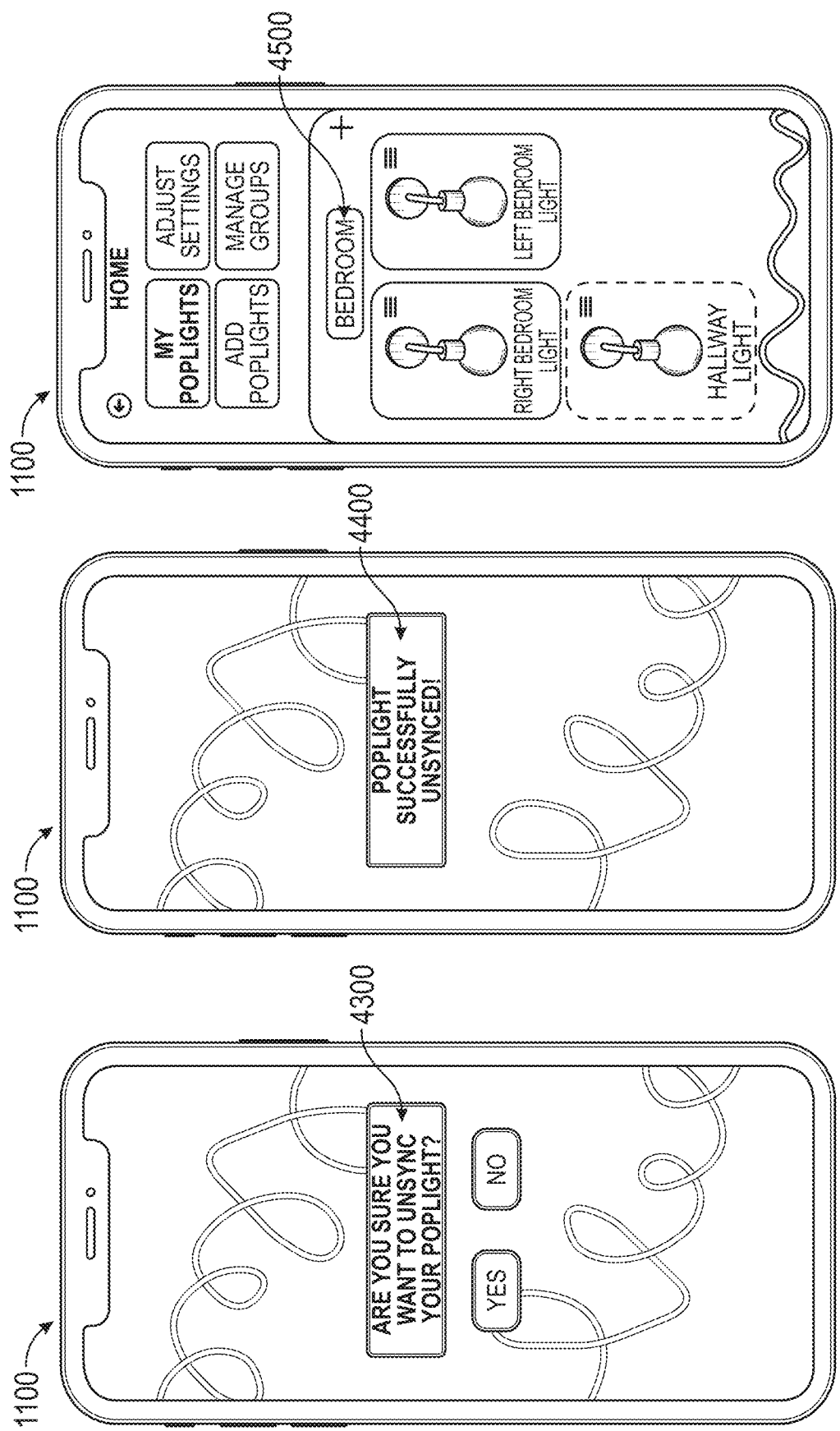

MOVEABLE LIGHT FIXTURE

CROSS-REFERENCE TO RELATED APPLICATIONS

This U.S. Non-Provisional Patent Application claims benefit of priority from U.S. Provisional Application Ser. No. 63/667,594, filed on Jul. 3, 2024, and U.S. Provisional Application Ser. No. 63/541,131, filed Sep. 28, 2023, the entire disclosures of each of which are hereby incorporated by reference.

TECHNICAL FIELD

This application relates to a moveable light fixture that may be controlled via an application running on an electronic device, such as a smart phone.

BACKGROUND

It is often desirable to add lighting to rooms, including on walls or ceilings. This often helps to make a room more inviting and encourages people to spend time in those rooms. Adding lighting to a room is generally limited by at least one of several factors. One factor is the difficulty of installing lighting, which requires either knowledge of electrical wiring, or the hiring of an electrician with the knowledge and experience to install electrical lighting. Another factor is the limited locations for the lighting, which is often restricted to a stud or crossmember within the wall or ceiling, such as where fasteners are used to couple to the stud or crossmember and/or the lighting is coupled to a box within the wall or ceiling (e.g., that is proximate to the stud or crossmember) or where wiring can be accessed. A third factor is the number of electrical outlets in rooms.

SUMMARY

Thus, there has been a long-felt and unresolved need in the art of lighting solutions for lighting that is simple to install, easy to move or reposition, and minimally impacted by the existing setup of the wall or ceiling to which the lighting is coupled. Embodiments of the present disclosure include an easily moveable light fixture that may be controlled by an application run on an electronic device. Additional embodiments are directed to lighting (or a lighting fixture, or a light fixture) that is easy to install.

To this end, embodiments of the present disclosure comprise a base, a plate to which the base is couplable and removable, and at least one pre-determined location on the plate to receive double-sided sticky tape or other adhesive-based mounting strips. The base further includes a housing, to which a light shade that receives or at least partially surrounds a light is installed. In some configurations, the light shade is coupled to the housing via an arm. In other configurations, the light shade is directly coupled to the housing. Optionally, the light shade includes a diffuser positioned within the housing proximate to the light.

In embodiments, the plate may include a notch (or notch area, or notch portion) that permits a user to pull on the end of the adhesive strip to cause the adhesion of the adhesive strip to release from the wall. The adhesive strip may be attached to the backside of the plate. Optionally, a tail end or tail end portion of the adhesive strip extends into the notch. The tail end or tail end portion being within the notch allows a user to pull on the ends of the adhesive strip (which releases the adhesives trip) in the notch, even with the plate attached to a wall. Thus, the moveable light fixture can be placed on a wall and removed from the wall without damaging or otherwise modifying the wall (e.g., without placing a fastener such as a screw and/or a drywall anchor in the wall).

In embodiments, a level may be built into the plate and/or the base. The level may be configured to allow the plate and/or the base to be leveled when mounting the plate and/or the base to the wall.

In embodiments, a battery is insertable into and removable from the base of the lighting. The battery may be configured to provide power to the moveable light fixture. The battery and/or the base may include electronics that are operable to transmit and/or receive signals from a controller (e.g., a remote, a smartphone, a computer, or other devices operable to transmit and/or receive signals). The battery and/or the base may have a specific or unique identification code that allows a user to control the lighting, either individually or in a group or subset of multiple lighting fixtures. The battery may include rechargeable batteries and/or a cradle operable to receive disposable batteries.

In embodiments, the moveable light fixture is configured to allow the moveable light fixture to be attached to a first location, removed from the first location, and reattached at a different location as many times as desired by the user. In some instances, the user may peel and remove protective strips on the adhesive strips attached on the backside of the plate of the base. When installing, the optional level may be used to make sure that the plate is in a desired position before firmly pressing the plate on the wall at the desired location. The housing of the base may then be rotated (e.g., turned in a clockwise or counterclockwise direction) to couple the housing onto the plate. A battery may be inserted into the base (e.g., into the housing) to provide power to a lighting element coupled to (or installed in) the housing of the base.

If the moveable light fixture needs to be moved after being attached to the wall, the light may be de-rotated (e.g., turned in a clockwise or counterclockwise direction) to unscrew and detach the housing from the plate. The adhesive strip includes a tail end, which is optionally accessible through a notch in the plate. The tail end of the adhesive strip is accessible (e.g., via the optional notch) to stretch and detach the adhesive strip from the wall. Once both adhesive strips have been stretched and detached from the wall, the base may be easily removed from the wall and moved to a different location.

Once detached, new adhesive strips may optionally be applied to the backside of the plate. The process of moving and attaching the moveable light fixture to different locations may be repeated as many times as desired.

In embodiments, an application, i.e., software program, may be run on an electronic device or a controller such as, but not limited to, a smart phone to control one or more moveable light fixtures. For example, the application may be in communication with components capable of transmitting and/or receiving data that are installed within the base and/or the battery inserted within the base. It should be appreciated that the application may be run on other types of electronic devices such as, but not limited to, a computer, laptop, tablet, or other types of mobile electronic device.

An aspect of the present disclosure is directed to a moveable light fixture, comprising a base having a housing and a plate that interfaces with a surface of a wall; an arm extending from a first end to a second end, the arm extending from the base at the first end; a light shade coupled to the arm at the second end; and one or more adhesive strips configured to be attached to the plate on one side of the one or more adhesive strips and configured to be attached to the surface of the wall on another side of the one or more adhesive strips.

In embodiments, the plate includes one or more raised surfaces for receiving at least a portion of the one or more adhesive strips and a notch for receiving a tail end of each of the one or more adhesive strips.

In embodiments, a width of the one or more raised surfaces is substantially equal to a width of the one or more adhesives strips and a length of the one or more raised surfaces is less than a length of the one or more adhesive strips.

In embodiments, the tail end of each of the one or more adhesive strips are exposed in the notch when the housing is removed from the plate.

In embodiments, the tail end of each of the one or more adhesive strips are unexposed in the notch when the housing is attached to the plate.

In embodiments, a width of the notch is substantially equal to a distance between a first outer edge of the one or more raised surfaces and a second outer edge of the one or more raised surfaces and a height of the notch is substantially equal to or less than a length of the tail end of each of the one or more adhesive strips.

In embodiments, the one or more adhesive strips includes two double-sided adhesive strips.

Another aspect of the present disclosure is directed to a moveable light fixture, comprising a base having a housing and a plate that interfaces with a surface of a wall, the plate having one or more raised surfaces and a notch; an arm extending from a first end to a second end, the arm extending from the base at the first end; a light shade coupled to the arm at the second end; and one or more adhesive strips configured to be attached to the corresponding one or more raised surfaces on one side of the one or more adhesive strips and configured to be attached to the surface of the wall on another side of the one or more adhesive strips, wherein a tail end of each of the one or more adhesive strips is positioned in the notch.

In embodiments, a width of the one or more raised surfaces is substantially equal to a width of the one or more adhesive strips and a length of the one or more raised surfaces is less than a length of the one or more adhesive strips.

In embodiments, a width of the notch is substantially equal to a distance between a first outer edge of the one or more raised surfaces and a second outer edge of the one or more raised surfaces and a height of the notch is substantially equal to or less than a length of the tail end of each of the one or more adhesive strips.

An aspect of the present disclosure is directed to a moveable light fixture. The moveable light fixture includes a base including a housing and a plate that is positionable on a surface of a wall; a battery that is installable in and removable from the housing of the base; a circuit board operable to control a lighting element that extends from the base; and one or more adhesive strips. A first side of the one or more adhesive strips is configured to be attached to a rear side of the plate. A second side of the one or more adhesive strips is configured to be attached to a surface of a wall. A tail end of each of the one or more adhesive strips is positioned in a notch of the plate when the plate is attached to the surface of the wall.

In embodiments, the circuit board is installed in the battery.

In embodiments, the circuit board is in communication with a controller via respective transmission and receiving (Tx/Rx) units. The moveable light fixture has a unique identification code. The controller is operable to control the moveable light fixture based on the unique identification code.

In embodiments, the moveable light fixture is controllable via an application interface on the controller that is executed by processors and stored on memory in the controller.

In embodiments, the battery is rechargeable.

In embodiments, the battery includes a charging port.

In embodiments, an indicator light is in communication with the battery to provide an indication of charge status on the battery.

In embodiments, the housing includes a battery slot. The battery includes a clip that secures the battery within the battery slot.

In embodiments, the battery includes an exterior surface that is contoured to conform to an exterior surface of the housing.

In embodiments, the moveable light fixture comprises a light shade extending from the base. The light shade includes the lighting element.

In embodiments, the moveable light fixture comprises an arm extending from a first end to a second end. The arm is coupled to the base at the first end. The light shade is coupled to the arm at the second end.

In embodiments, a collar extends from the base. The lighting element is proximate to the collar.

In embodiments, the moveable light fixture comprises a diffuser positioned proximate to the lighting element. The diffuser is secured to the collar via an interlocking assembly.

An aspect of the present disclosure is directed to a moveable light fixture. The moveable light fixture includes a base including a housing and a plate that is positionable on a surface of a wall. The housing is couplable to and removable from the plate via an interlocking assembly that engages when the housing is rotated with respect to the plate. The plate includes a notch at a distal end of the plate. The moveable light fixture includes a light shade extending from the base. The light shade includes a lighting element. The moveable light fixture includes one or more adhesive strips. A first side of the one or more adhesive strips is configured to be attached to a rear side of the plate. A second side of the one or more adhesive strips is configured to be attached to a surface of a wall. A tail end of each of the one or more adhesive strips is accessible through the notch of the plate when the plate is attached to the surface of the wall.

In embodiments, the plate includes one or more raised surfaces for receiving at least a portion of the one or more adhesive strips.

In embodiments, a width of the one or more raised surfaces is substantially equal to a width of the one or more adhesives strips, and a length of the one or more raised surfaces is less than a length of the one or more adhesive strips.

In embodiments, the tail end of each of the one or more adhesive strips is exposed in the notch when the housing is removed from the plate.

In embodiments, the tail end of each of the one or more adhesive strips are covered in the notch by the housing when the housing is attached to the plate.

In embodiments, a width of the notch is substantially equal to a distance between a first outer edge of the one or more raised surfaces and a second outer edge of the one or more raised surfaces. A height of the notch is substantially equal to or less than a length of the tail end of each of the one or more adhesive strips.

In embodiments, the one or more adhesive strips includes two double sided adhesive strips. Both tail ends of the two double sided adhesive strips are accessible through the notch of the plate.

In embodiments, the moveable light fixture includes an arm extending from a first end to a second end. The arm is coupled to the base at the first end. The light shade is coupled to the arm at the second end.

In embodiments, the moveable light fixture includes a collar. A neck of the light shade couples to the collar via a second interlocking assembly.

In embodiments, the moveable light fixture includes a diffuser proximate to the lighting element within the light shade. The diffuser couples to the light shade via a second interlocking assembly.

An aspect of the present disclosure is directed to a control system for a battery-powered device. The control system includes at least one moveable light fixture. Each light fixture includes a base with a housing that is couplable to a plate positioned on a surface of a wall, where a lighting element is coupled to the base. Each light fixture includes a battery that is insertable in and removable from the housing, the battery includes a circuit board that generates a unique identification code for a respective moveable light fixture and a first transmission and receiving (Tx/Rx) unit, where the circuit board is operable to control the lighting element. Each light fixture includes one or more adhesive strips, where a first side of the one or more adhesive strips is configured to be attached to a rear side of the plate, and where a second side of the one or more adhesive strips is configured to be attached to a surface of a wall. The control system includes a controller including a second transmission and receiving (Tx/Rx) unit, where the second Tx/Rx unit of the controller is in communication with the first Tx/Rx unit in the battery, and where the controller is operable to control the lighting element of the respective moveable light fixture based on the unique identification code.

In embodiments, each light fixture including an arm extending from a first end to a second end, where the arm is coupled to the base at the first end, and where the light shade is coupled to the arm at the second end.

Further aspects and embodiments are provided in the foregoing drawings, detailed description, and claims.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein. As used herein, the singular forms "a," "an," and "the" include plural referents unless the context clearly indicates otherwise. For example, reference to "a substituent" encompasses a single substituent as well as two or more substituents, and the like.

Unless otherwise indicated, all numbers expressing quantities, dimensions, conditions, ratios, ranges, and so forth used in the specification and claims are to be understood as being modified in all instances by the term "substantially" or "about" or "approximately". When used with a number or a range, the terms "substantially" or "about" and "approximately" indicate the number or range may be "a little above" or "a little below" the endpoint with a degree of flexibility as would be generally recognized by those skilled in the art. Further, the terms "substantially" or "about" and "approximately" may include the exact endpoint, unless specifically stated otherwise. Accordingly, unless otherwise indicated, all numbers expressing quantities, dimensions, conditions, ratios, angles, ranges, and so forth used in the specification and claims, including those defined with the term "substantially", may be increased or decreased by approximately 5% to achieve satisfactory results. Unless otherwise indicated, the term "substantially" indicates a difference of from 0% to ±5% of the stated value is acceptable. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated.

All ranges described herein may be reduced to any sub-range or portion of the range, or to any value within the range without deviating from the present disclosure. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

As used herein, "for example," "for instance," "such as," or "including" are meant to introduce examples that further clarify more general subject matter. Unless otherwise expressly indicated, such examples are provided only to aid in understanding embodiments illustrated in the present disclosure and are not meant to be limiting in any fashion. Nor do these phrases indicate any kind of preference for the disclosed embodiment.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 41 is an application interface that may be used to enter a name for a moveable light fixture or a group of moveable light fixtures, for use with the control system of FIG. 19A;

FIG. 42 is an application interface that may be used to display grouping information, for use with the control system of FIG. 19A;

FIG. 43 is an application interface that may be used to display moveable light fixtures and create one or more groups of moveable light fixtures, for use with the control system of FIG. 19A;

FIG. 52 is an application interface that may be used for syncing and unsyncing lights, for use with the control system of FIG. 19A;

FIG. 53 is an application interface that may be used for syncing and unsyncing lights, for use with the control system of FIG. 19A; and FIG. 54 is an application interface that may be used to provide grouping options and lighting fixture status, for use with the control system of FIG. 19A.

Figure 1A:
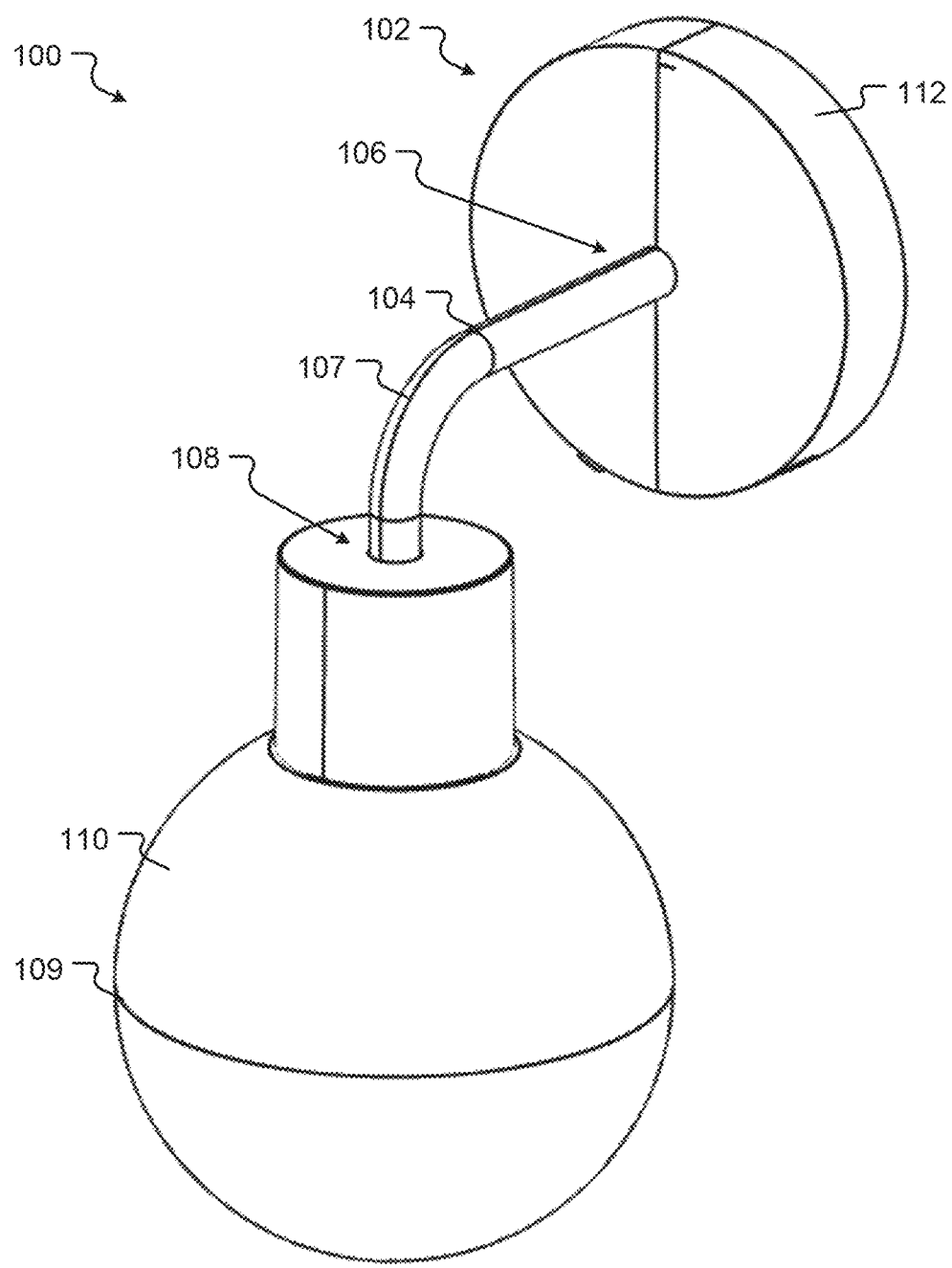
FIG. 1A is a perspective view of a moveable light fixture according to at least one embodiment of the present disclosure.
Figure 1B:
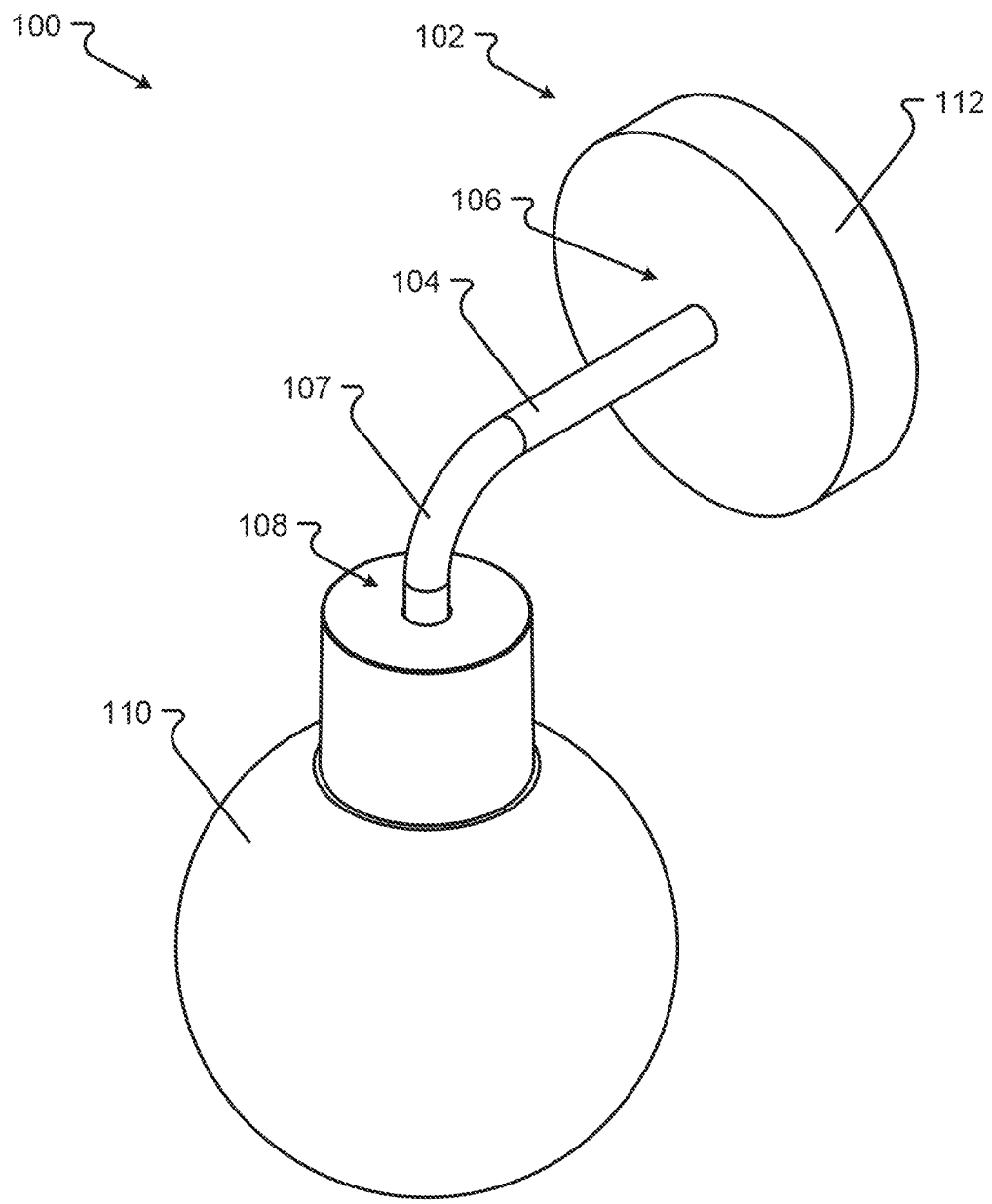
FIG. 1B is a perspective view of a variation of the moveable light fixture of FIG. 1A, according to at least one embodiment of the present disclosure.

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

In the following description of various embodiments, components, sub-assemblies, and/or assemblies of lighting fixture systems of different embodiments are identified by the same reference numbers. Those corresponding components, sub-assemblies, and/or assemblies between two embodiments that are different in at least some respects are identified by the same reference number but may include a suffix such as a letter (e.g., 4 versus 4A, etc.).

DETAILED DESCRIPTION

The following description recites various aspects and embodiments as disclosed herein. The embodiments provide non-limiting examples of various compositions, and methods that are included within the scope of the claimed disclosure. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, "double-sided sticky tape" or "double-sided strips" refers to tape or another adhesive-based mounting strip that has pressure-sensitive adhesive exposed on both sides. This enables two components to be secured together, such as a plate to a wall or ceiling surface. The medium on which the adhesive is applied can range in thickness from a film a fraction of a millimeter to a foam several millimeters thick. Additionally, the adhesive can be formulated for specific purposes, including adhesives that are low tack and repositionable, and/or adhesives that form a permanent bond. However, it should be understood that many of the adhesive formulations usable with this disclosure are designed to be removed without leaving any residue. It is contemplated that the double-sided tape may have the same adhesive on both sides, or may utilize two different adhesives. 3M VHB tapes, 3M Thin Bonding tapes, and 3M Foam tapes are examples of double-sided tapes.

As used herein, "moveable light fixture" and "Poplight" are to be considered equivalent, representing a light (or light fixture, or lighting fixture) that may be, installed, uninstalled, moved, and reinstalled as many times as desired between one or more different locations.

Adding one or more lights to a room can transform the room from a dark cave to a warm haven. However, many homes were constructed with limited lighting options. Adding lighting to rooms in these homes can be difficult, as an electrician or contractor is often required to re-wire the homes to install the lights. Additionally, these homes are often constructed with a limited number of electrical outlets. Adding lamps is thus limited by the number of electrical outlets (and optionally the floor space).

An additional consideration is that dorms and rental properties often have restrictions on the methods for attaching objects to walls. Many dorms and rental properties do not allow nailing or screwing objects into the walls of the dorm or rental property. This severely limits the possibilities for adding lights or other objects to walls.

As such, embodiments of the present disclosure are directed to a repositionable lighting fixture that enables installation of electrical lighting without the need of an electrician. The lighting fixtures may be installed at any location on a wall or ceiling, without needing to run wiring. The lighting fixtures are sufficiently lightweight to not need a box installed proximate to a stud or crossmember. The lighting fixtures are coupled to the wall or ceiling with an adhesive-based mounting strip that does not damage or otherwise modify the wall or ceiling (e.g., with fasteners, anchors, or the like). With the use of the adhesive-based mounting strip, the lighting fixture may be installed, uninstalled, moved, and reinstalled as desired by a user.

Embodiments of the present disclosure are also directed to an onboard power source, such as a removable battery (e.g., which may or may not be rechargeable). Where the removable battery is rechargeable, the battery may be removed and separately charged (e.g., via a USB port or via induction charging), or may be charged via a USB port on the base of the lighting fixture (or on the battery itself). The battery and/or the base of the lighting fixture may house electronics in communication with a controller such as a remote, a smartphone running an application, or a computer. The controller may be used to control one or more lighting fixtures individually or in subsets or groups, as desired by the user, with unique identifiers for each lighting fixture being housed in the base and/or in the battery.

FIGS. 1A-8D in general illustrate a moveable lighting fixture 100. It should be understood that "lighting fixture", "light fixture", and "lighting" may be used interchangeably with respect to FIGS. 1A-8D.

Figure 2:
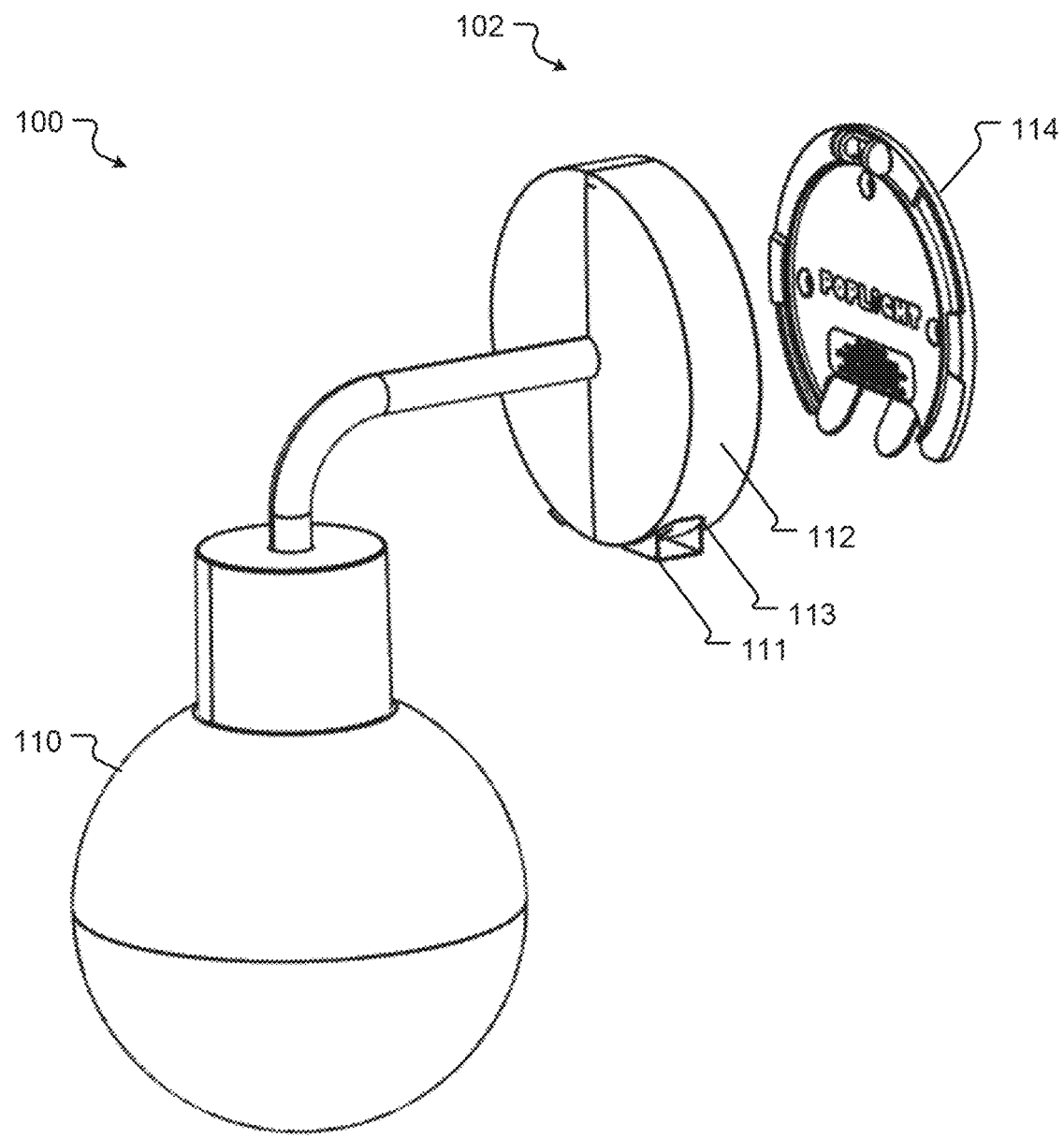
FIG. 2 is a partially exploded perspective view of the moveable light fixture of FIG. 1A.

Referring now to FIGS. 1A-2, a perspective view and a partially exploded perspective view of a moveable light fixture 100. The moveable light fixture 100 includes a base 102, an optional arm 104 extending from the base 102 at a first end 106 to a second end 108, and a light shade 110 connected to the arm 104 at the second end 108. It should be understood that the arm 104 is optional, in that the light shade 110 may be directly coupled to the base 102 (e.g., for a flush or substantially-flush wall sconce design), without departing from the scope of the present disclosure.

As shown, the light shade 110 is spherical (e.g., as a circular cross-section), though in other embodiments, the light shade 110 may be any shape or size without departing from the scope of the present disclosure. For example, the light shade 110 may be semi-spherical, conical, frustoconical, cylindrical, a rectangular prism, or any polygonal shape including up to an N number of surfaces. In some non-limiting examples, the light shade 110 may be a tetrahedron, a hexahedron, an octahedron, a dodecahedron, or an icosahedron, By way of another example, the light shade 110 may be shaped to represent a particular sports, hobby, nature theme, pop culture reference, or historical reference. For instance, the light shade 110 may be in the shape of a ball including a basketball, soccer ball, baseball or softball, tennis ball, golf ball, football, or the like.

In embodiments, as illustrated in FIG. 1A, the light shade 110 may include a seam 109 to remove a portion of the light shade 110 from a remainder of the light shade 110 that is coupled to the base 102. For example, the portion of the light shade 110 may be removed to interact with a lighting element 136, as described in detail further herein. In other embodiments, as illustrated in FIGS. 1B and 8A-8D, the light shade 110 may be a single-piece component that is removable from the base 102 (e.g., from a collar 150, as described in detail further herein) to interact with a lighting element 136 and/or other components housed within the light shade 110, without departing from the scope of the present disclosure.

In embodiments, the light shade 110 may be fabricated from one or more pieces of a plastic, a metal, and/or a fabric. In additional embodiments, the light shade 110 may be opaque, may be translucent (e.g., with an optional coating to diffuse light), or may be transparent.

Referring to FIG. 2, the base 102 is configured to receive a battery pack or battery 111. The battery 111 may comprise any desired type of battery 111. For example, the battery 111 may be rechargeable. By way of another example, the battery 111 may include a cradle for disposable batteries such as AA, AAA, AAAA, or any other known disposable battery size. In some embodiments, the batteries 111 may be made of lithium and/or nickel. As described in detail further herein, the battery 111 is removable from the base 102 to be charged and reinserted, interchanged with another battery 111 (e.g., that is charged), and/or to allow for the replacement of disposable batteries within the cradle.

Figure 8A:
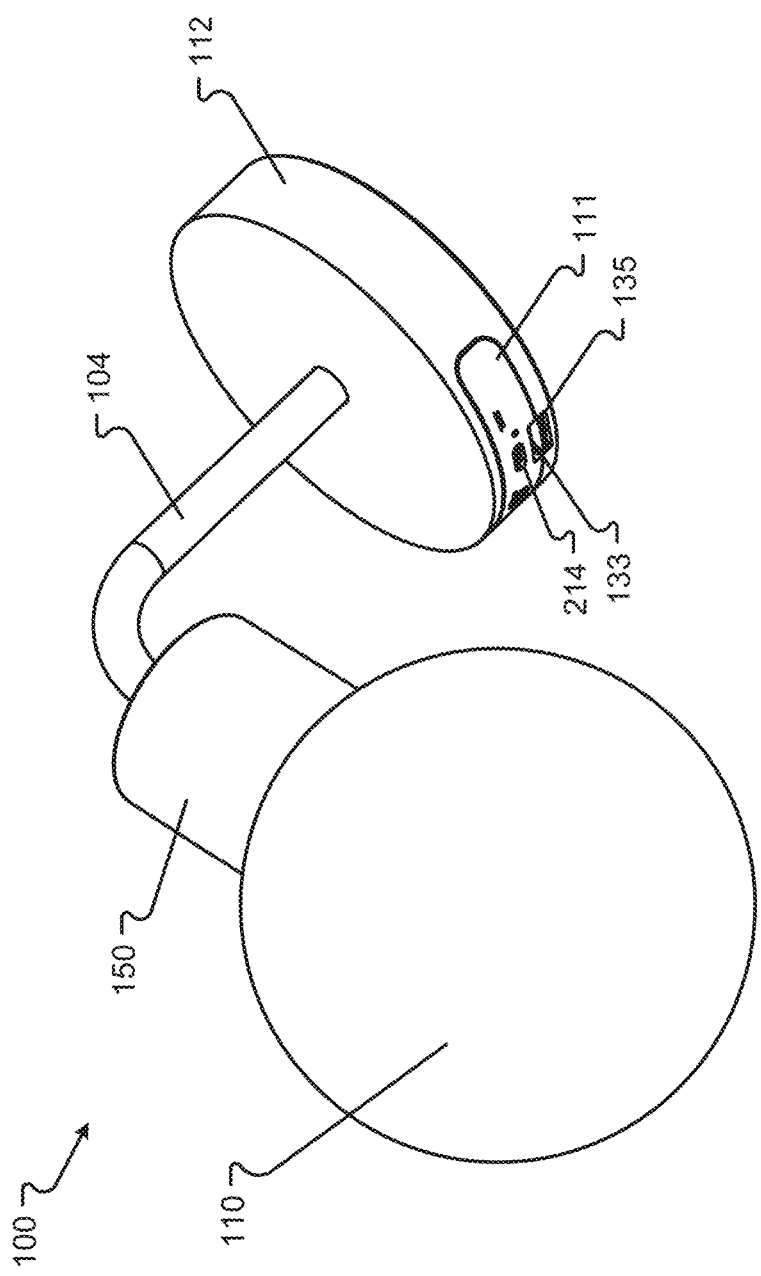
FIG. 8A is a second perspective view of the variation of the moveable light fixture of FIG. 1B.
Figure 8B:
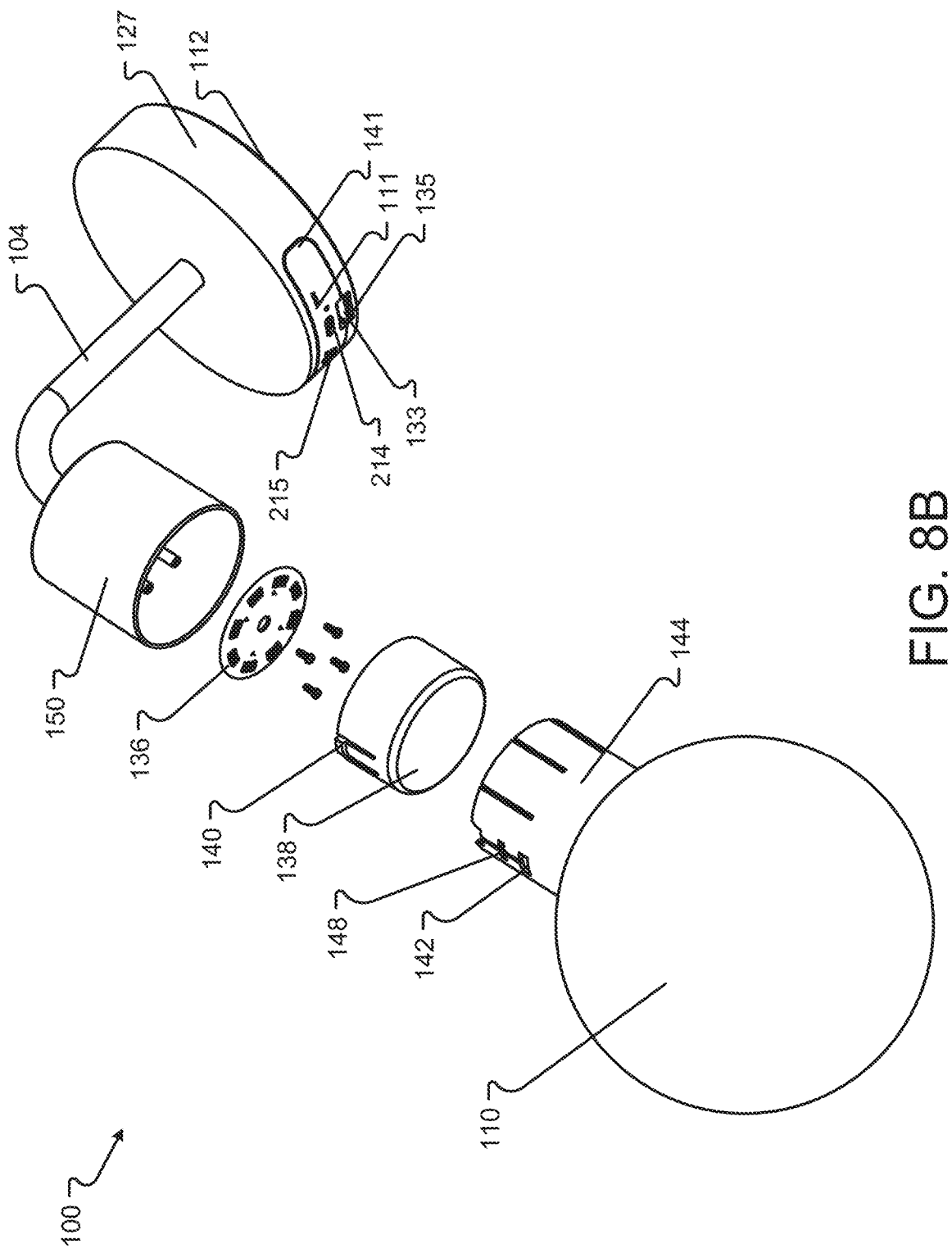
FIG. 8B is an exploded perspective view of the moveable light fixture of FIG. 8A.
Figure 8C:
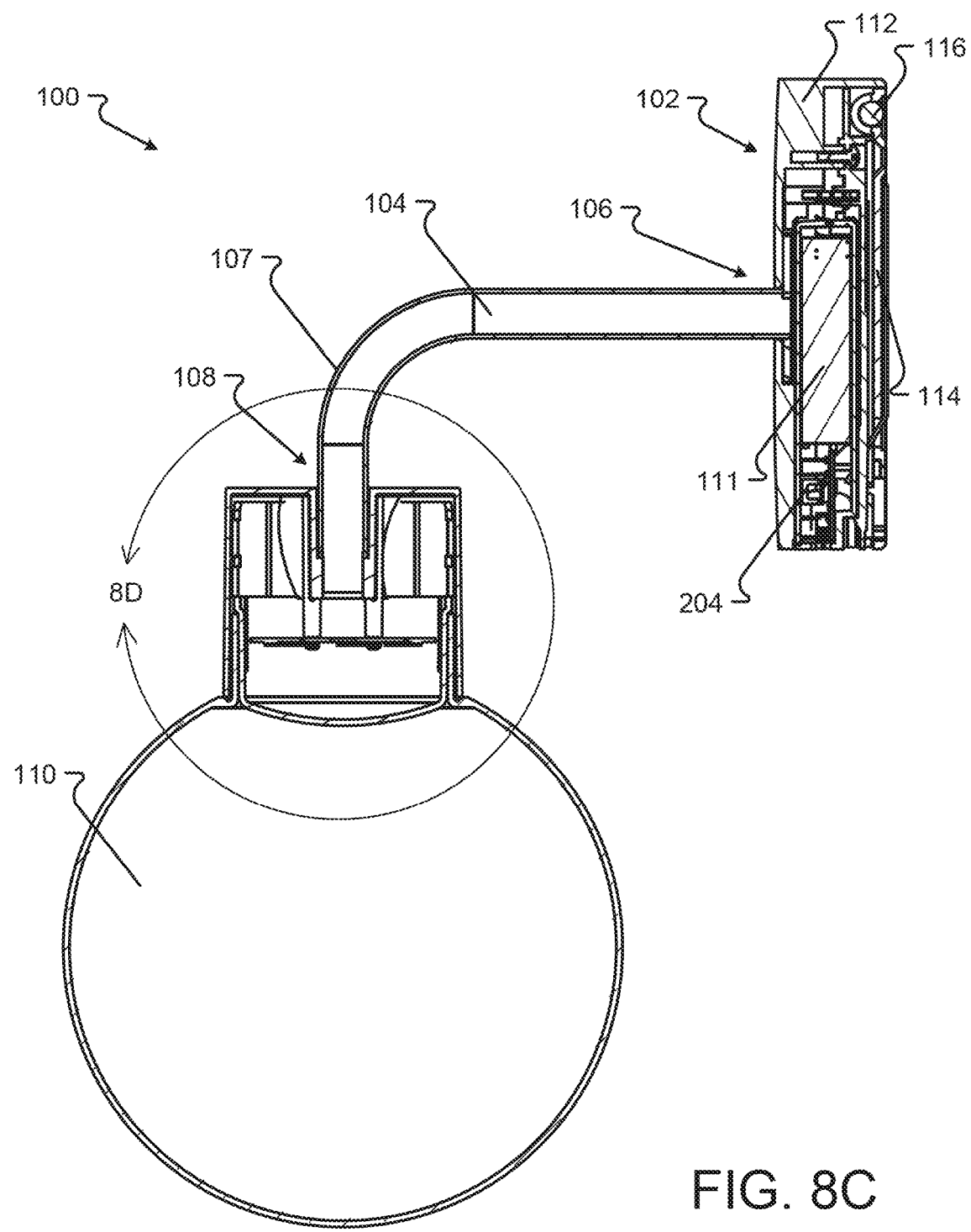
FIG. 8C is a cross-section view of the moveable light fixture of FIG. 8A, with detail view 8D.
Figure 8D:
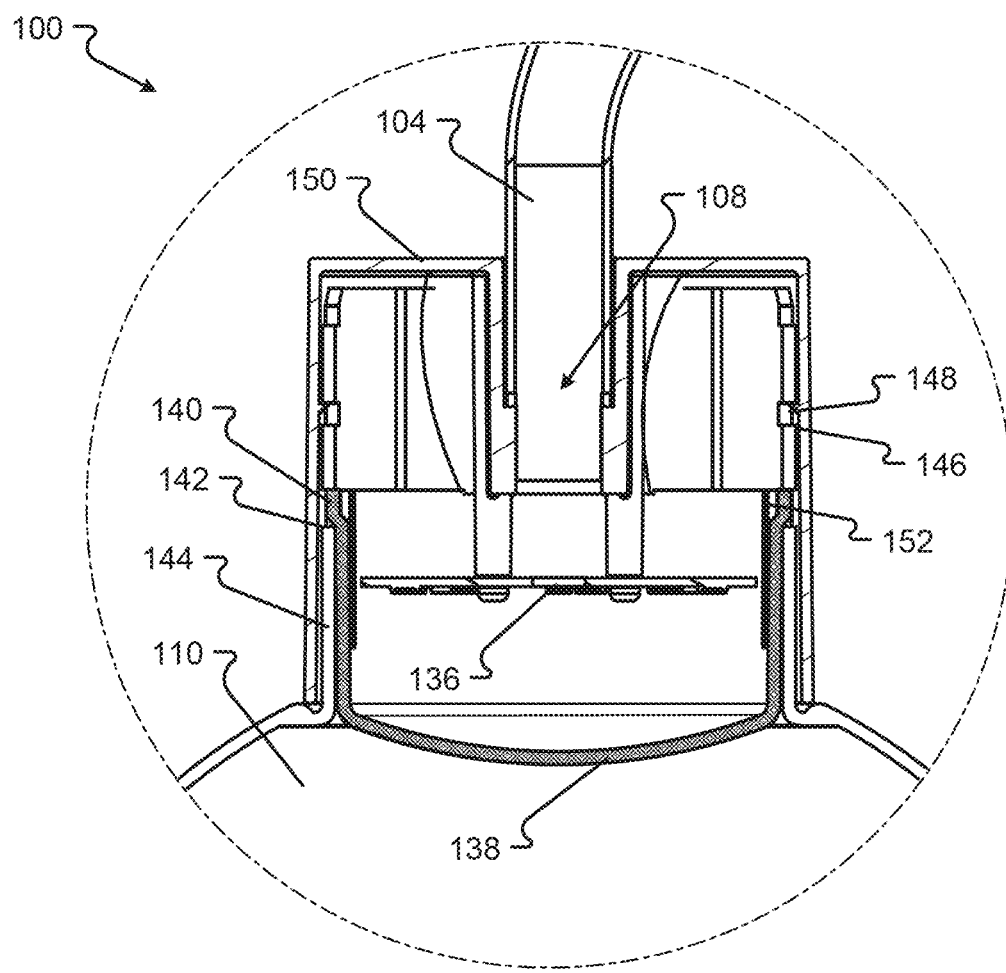
FIG. 8D is a partial cross-section view of the moveable light fixture of FIG. 8C.

The base 102 includes a housing 112. In some embodiments, the housing 112 includes a battery slot 113 configured to receive the battery 111. In some embodiments, an exterior surface 141 of the battery 111 is contoured to conform to an exterior surface (e.g., sidewalls 127, endwall or end face, or the like) of the housing 112 (e.g., as illustrated in FIGS. 8A-8B), to promote an increased level of aesthetic appeal for the light fixture 100. It is contemplated, however, that the battery 111 may have an exterior surface that may not conform to the housing 112 (e.g., as illustrated in FIG. 2) and/or may include a notch configured to receive one or more of a user's fingers, to promote increased surface contact area for a user when interchanging the battery 111. It is additionally contemplated that the battery 111 may be dimensioned to fully seat within the housing 112, such that a cover is installable over the battery 111 in the housing 112 (e.g., within the sidewall or an end face of the housing 112), to protect the battery slot 113).

As illustrated in FIGS. 8A-8B, the battery 111 engages the housing 112 with an interlocking assembly. For example, the interlocking assembly may have a clip 133 or other actuatable component (e.g., with a living hinge or other flexible member) that engages a receptacle 135 within the housing 112. By way of another example, the battery 111 may have grooves that engage protrusions within the battery slot 113 to hold the battery 111 in place within the housing 112. The battery 111 may be removable via a pulling or prying motion, to overcome a snap-in force provided by the housing 112 on the battery 111. Further, the battery slot 113 may include a biasing element or other mechanism that allows for the battery 111 to be depressed into the housing 112 and ejected, due to a biasing force providing on the battery 111 by the biasing element.

Where the lighting fixture 100 includes the arm 104, the first end 106 of the arm 104 may be fixed to the housing 112 (e.g., via an adhesive, via a non-releasable interlocking assembly, formed as a single integrated component during fabrication with injection molding, 3D printing or other additive manufacturing, or the like). Alternatively, the first end 106 of the arm 104 may be coupled to and removable from the housing 112 (e.g., via a releasable interlocking assembly, threading, or the like).

In embodiments, the arm 104 further includes a bent portion 107 to set the light shade 110 at an angle relative to the base 102. For example, the angle may be a 90 degree angle (e.g., as shown in the illustrated embodiment), or may be an oblique angle (e.g., an obtuse angle where the light shade 110 is directed outward from the wall surface, or an acute angle where the light shade 110 is directed inward toward the wall surface). It will be appreciated that in other embodiments, the arm 104 may include one or more bends or bent portions 107 having any angle or may not include a bend or bent portion 107 (e.g., the arm 104 may be straight).

Figure 3:
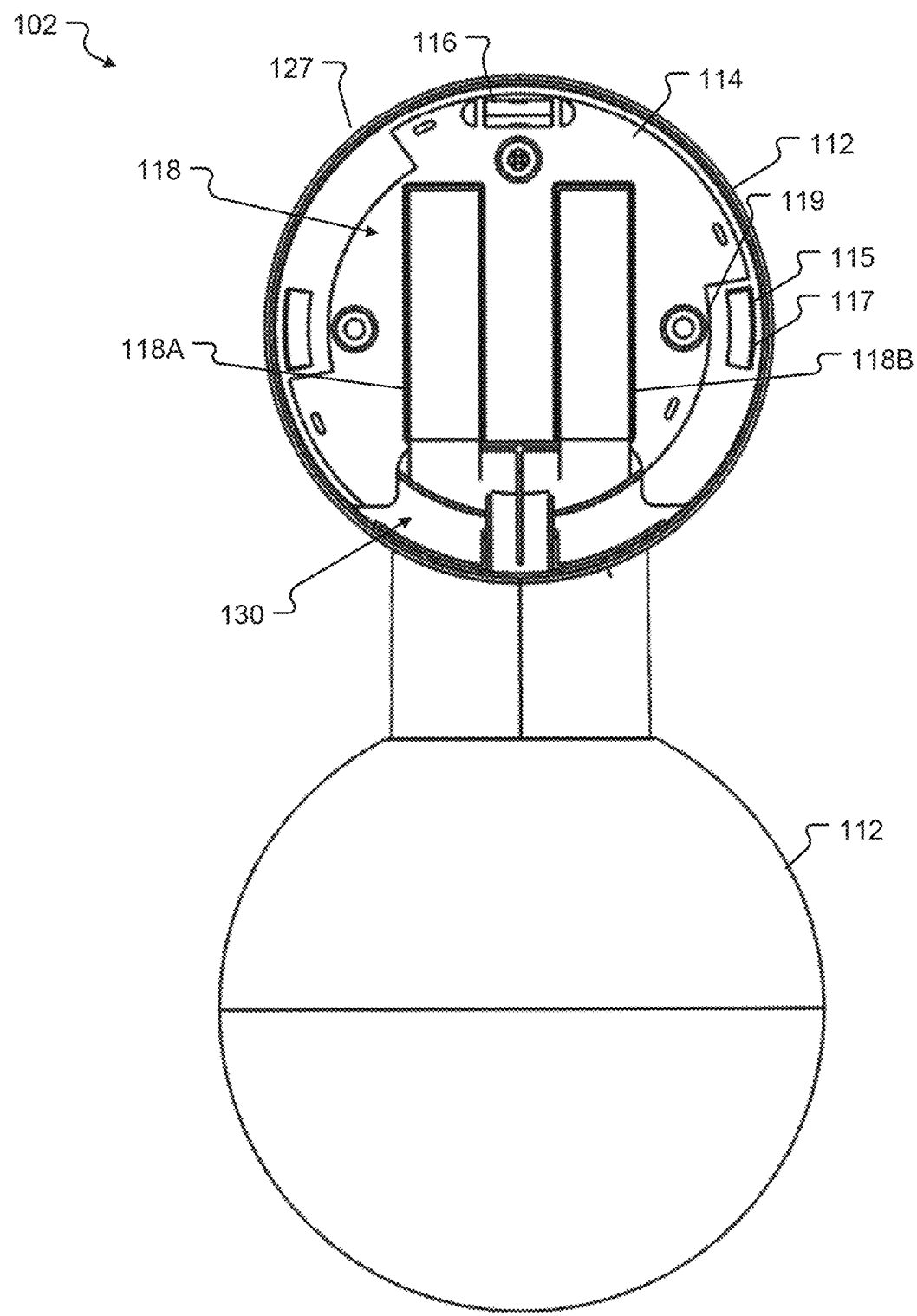
FIG. 3 is a rear view of the moveable light fixture of FIG. 1A.

Referring now to FIG. 3, a rear view of the moveable light fixture 100 is shown. In embodiments, the base 102 includes a plate 114 that engages the housing 112 via an interlocking assembly. For example, the plate 114 may include one or more tabs or protrusions 115 that each engage a corresponding recess or aperture 117 on the housing 112. By way of another example, the plate 114 includes a recess that receives a tab from the housing 112. In general, the housing 112 and the plate 114 may include any interlocking features or assembly that allows the housing 112 to be coupled to (and uncoupled from) the plate 114, including with a rotation about a common axis through both the housing 112 and the plate 114.

Figure 12:
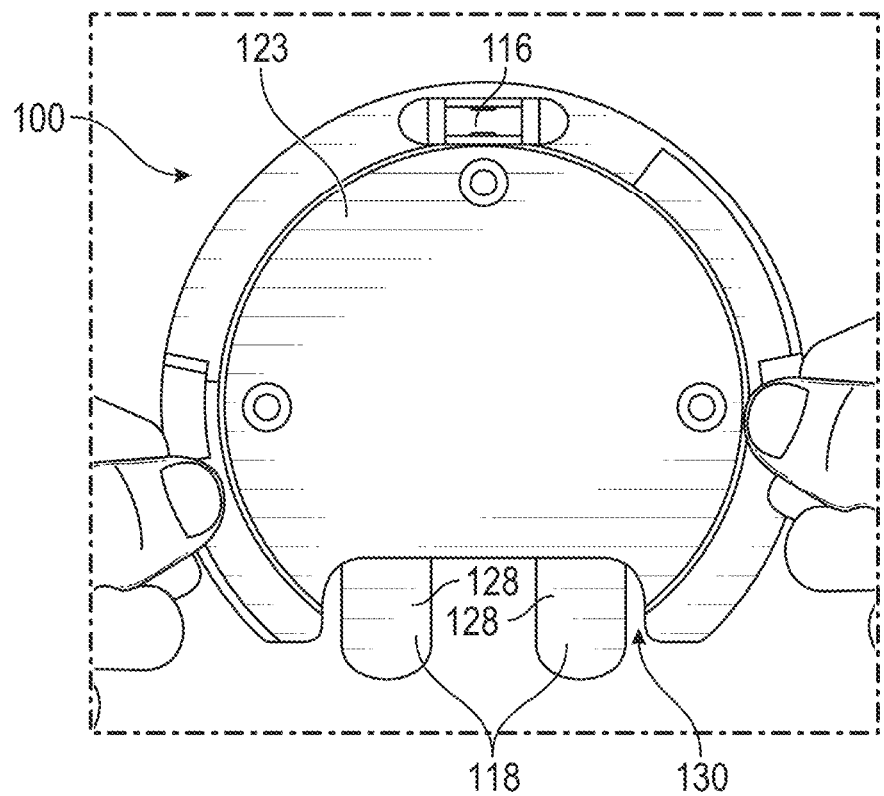
FIG. 12 is an illustration of a frontside of the plate, a frontside of the level and a portion of the adhesive strips extending into a notch formed in a bottom of the plate of FIG. 1A, according to the process of FIG. 9.
Figure 13:
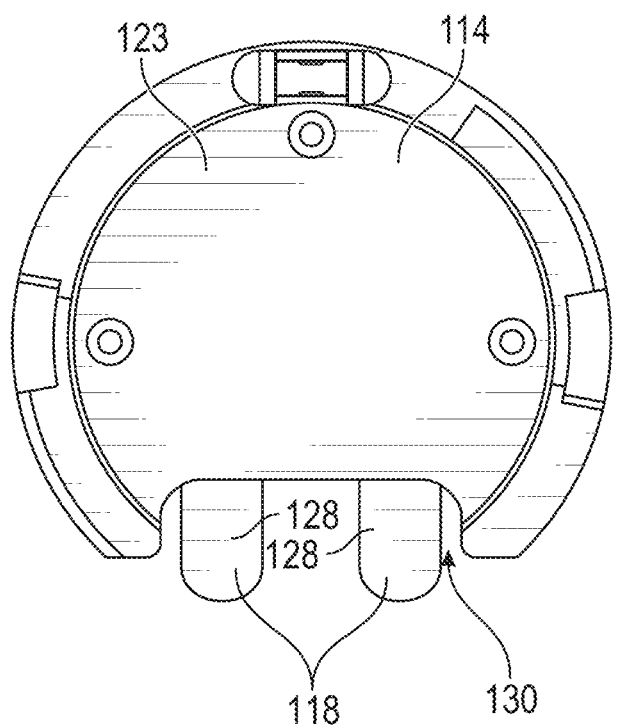
FIG. 13 is an illustration of the frontside of the plate mounted to a wall with the portion of the adhesive strips extending into the notch formed in the bottom of the plate of FIG. 1A, according to the process of FIG. 9.

In embodiments, the plate 114 may optionally include a level 116. In other embodiments, the housing 112 may include the level 116. The level 116 can assist a user in ensuring that the moveable light fixture 100 is attached to the wall in a level orientation. The level 116 may fit within a recess or hole on the plate 114 and/or in the housing 112. In some instances, the level 116 is positioned proximate to a top edge of the plate 114. As shown in FIGS. 1, 12, and 13, the housing 112, once attached, may hide the level 116 when the housing 112 is attached to the plate 114. This enables the level 116 to assist in the installation of the plate 114 in a level orientation and then be hidden from view once the moveable light fixture 100 is attached to the plate 114. Keeping the level 116 hidden from view may be desirable to present a streamlined and professional looking moveable light fixture 100.

Referring now to FIGS. 4-7, additional features of the plate 114 will be described in detail. The plate 114 may be formed of one or more pieces of a solid material such as, for example, plastic, metal, a metal alloy, or the like. In some embodiments, the plate 114 may be formed from the same material as the housing 112, though in other embodiments the plate 114 may be formed from a different material than the housing 112. The plate 114 comprises at least a backside 121 (e.g., that faces the wall when installed) and a frontside 123 connected to the housing 112 of the base 102. The backside 121 of the plate 114 further comprises a recessed area 125. The recessed area 125 comprises one or more structural features constructed to install the light fixture 100 with details described below.

Figure 4:
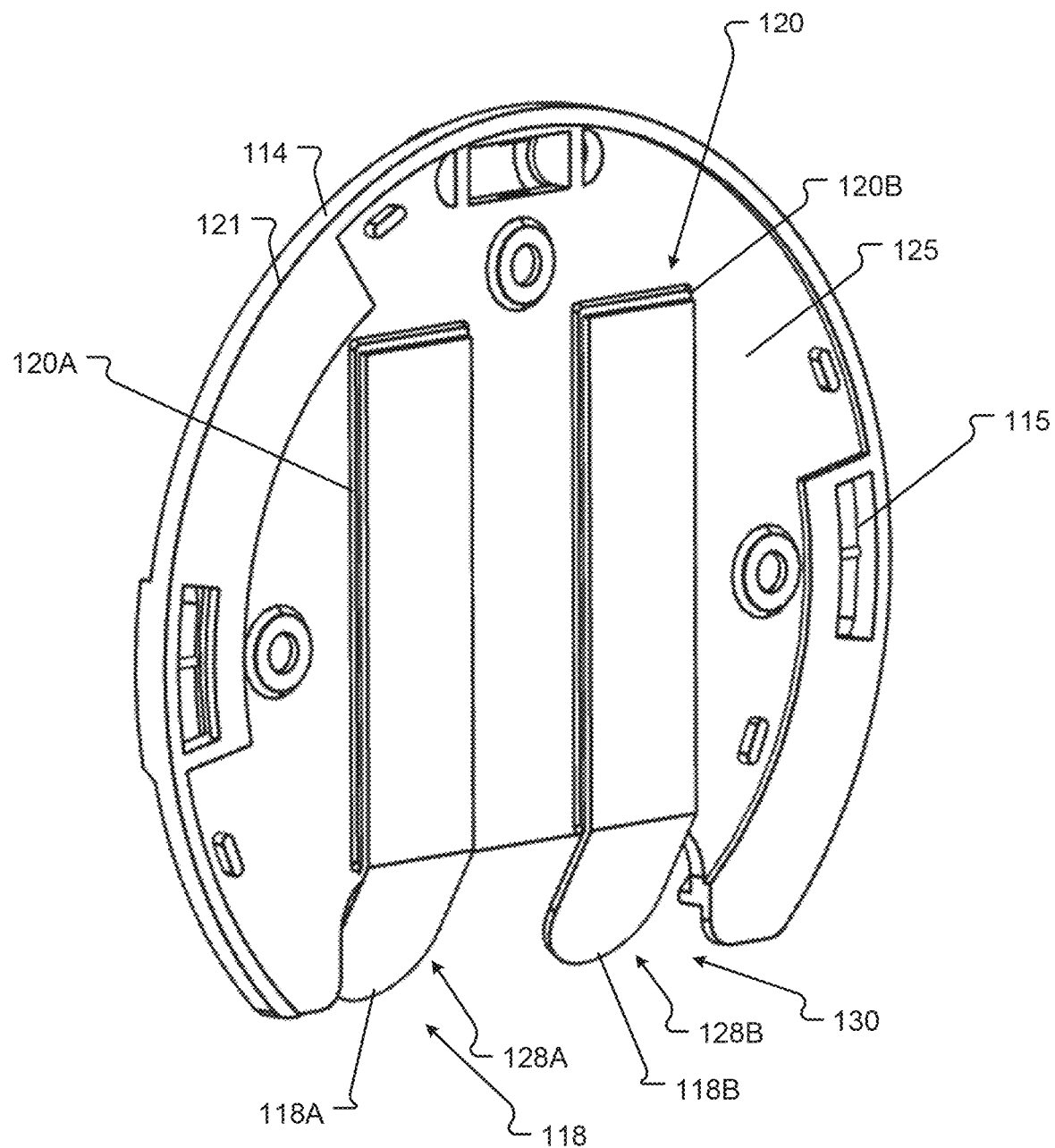
FIG. 4 is a rear perspective view of a plate of the moveable light fixture of FIG. 1A with one or more adhesive strips installed.

As shown in FIG. 4, the backside 121 of the plate 114 can be mounted to the wall via one or more adhesive strips 118. In the illustrated embodiment, the recessed area 125 of the plate 114 comprises at least two rectangular raised surfaces 120 arranged parallel to each other. The recessed area 125 further comprises one or more apertures that are aligned with the one or more tabs or protrusions 115 on the frontside 123, which are used to connect to the corresponding apertures 117 of the base 102 (not shown).

In embodiments, two adhesive strips 118A, 118B are shown, though it will be appreciated that in other embodiments the one or more adhesive strips 118 may include one adhesive strip, two adhesive strips, or more than two adhesive strips. The one or more adhesive strips 118 may be, for example, double sided sticky tape that can be removably attached to the backside 121 of the plate 114 on one side and removably attached to the wall on the other side. The one or more adhesive strips 118 may include an adhesive that is formulated to be cleanly removed from the wall and the plate 114 after use. In the embodiment shown in FIG. 4, the adhesive strips 118 are arranged on the raised surfaces 120A, 120B. In the present embodiment, two adhesive strips 118 are double-layered and double-sided adhesive strips.

Although embodiments of the present disclosure are directed to the use of adhesive strips 118, the plate 114 includes apertures 119 that may optionally be used to couple the plate 114 to the wall via fasteners. The apertures may or may not be threaded, depending on the types of fasteners used. In this regard, it should be understood that attachment to a wall via the adhesive strips 118 is not intended to be limited to the present disclosure.

As discussed above and shown in FIG. 5 (also labeled in FIGS. 4 and 6), the plate 114 includes one or more raised surfaces 120 on which the one or more adhesive strips 118 may be placed. The one or more raised surfaces 120 provide a visual for a user to place the one or more adhesive strips 118 and ensure that the one or more adhesive strips 118 are placed in an optimal position relative to the plate 114 and the moveable light fixture 100. In alternative embodiments, the raised surfaces 120 are instead embedded surfaces within a thickness of the plate 114, to similar be of use in locating the correct position for the adhesive strips 118 on the plate 114, without departing from the scope of the present disclosure. Thus, the one or more raised surfaces 120 ensure that the one or more adhesive strips 118 are placed properly so as to secure and hold the moveable light fixture 100 on the wall.

Figure 6:
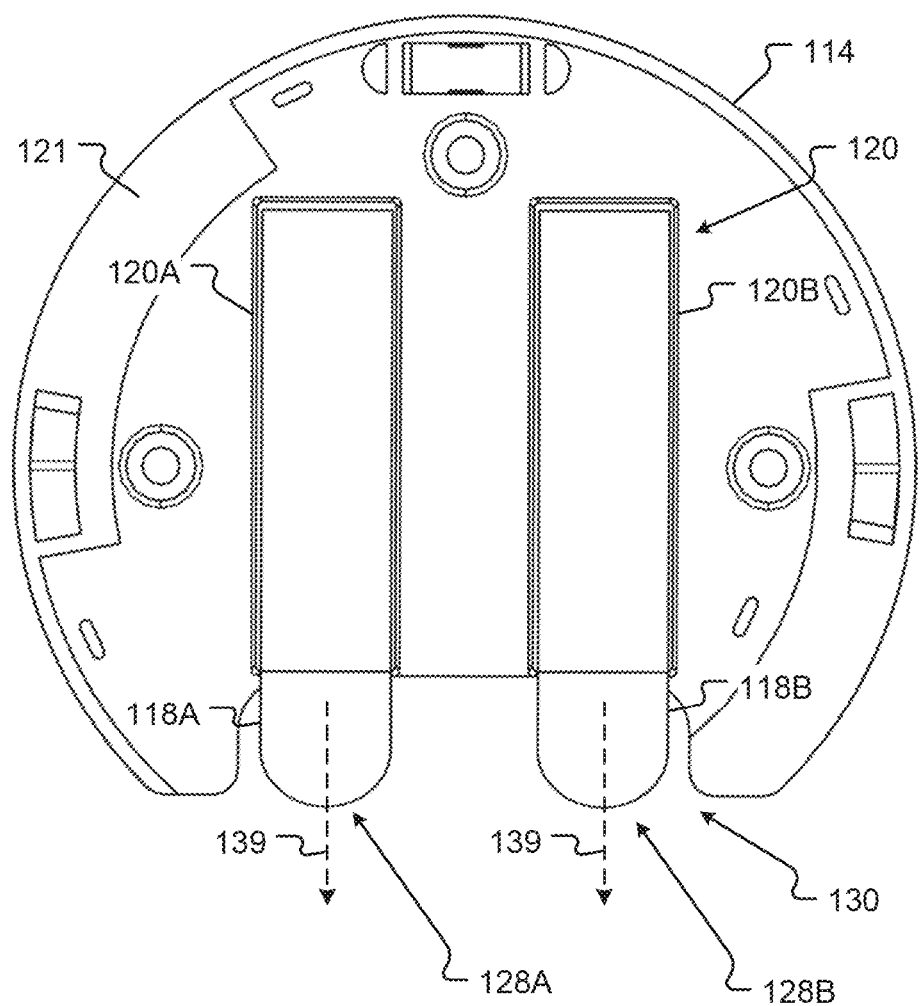
FIG. 6 is a rear view of the plate of FIG. 4, with one or more adhesive strips installed.
Figure 7:
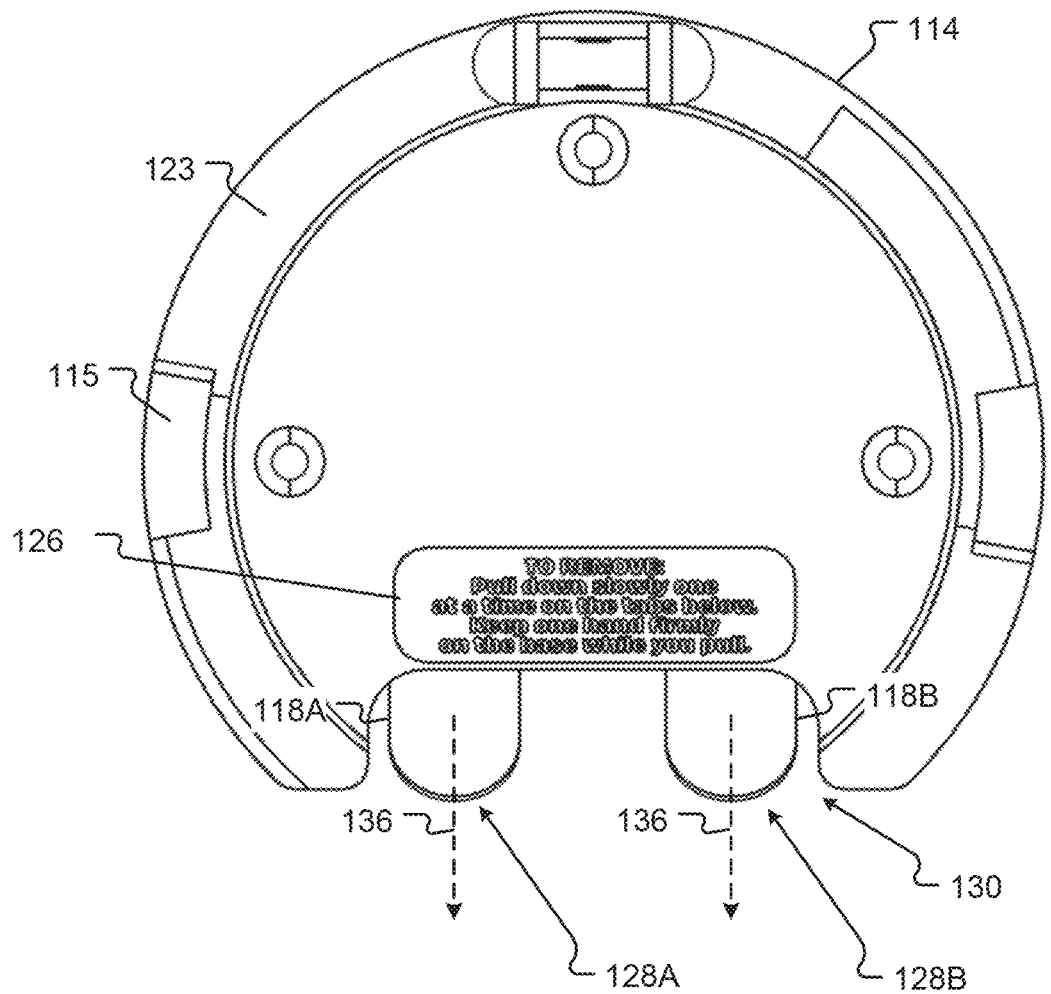
FIG. 7 is a front view of the plate of FIG. 4, with one or more adhesive strips installed.

In the illustrated embodiments, the one or more raised surfaces 120 include two raised surfaces 120A, 120B, though in other embodiments, the one or more raised surfaces 120 may include one raised surface, two raised surfaces, or more than two raised surfaces. The one or more raised surfaces 120 may have a textured surface or a smooth surface. Each of the one or more raised surfaces 120 have a raised surface length 122A, 122B and a raised surface width 124A, 124B. The raised surface width 124A, 124B may have a width substantially equal to a width of the two adhesive strips 118A, 118B. In other embodiments the raised surface width may be greater than or less than the width of the two adhesive strips 118A, 118B. The raised surface length 122A, 122B may have a length less than a length of the two adhesive strips 118A, 118B such that a tail end 128A, 128B of the two adhesive strips 118A, 118B extend past the plate 114, as shown in FIGS. 4, 6, and 7. In such embodiments, the tail ends 128A, 128B may extend into a window or notch 130 at a distal end of the plate 114. It will be appreciated that in other embodiments, the raised surface length 122A, 122B may be substantially equal to or less than the length of the two adhesive strips 118A, 118B.

In the illustrated embodiment, the one or more (e.g., two, in some non-limiting examples) adhesive strips 118A, 118B has two long-edges and two short edges. When placing the adhesive strips 118A, 118B on the raised surfaces 120A, 120B, users align the long edges of the adhesive strips with the long edges of the raised surfaces 120A, 120B, and similarly, align the short edges of the adhesive strips 118A, 118B with the short edges of the raised surfaces 120A, 120B. It is appreciated that in some embodiments, the raised surfaces 120A, 120B and the adhesive strips 118A, 118B may or may not be in a rectangular shape, and the shape of the adhesive strips 118A, 118B may or may not match the shape of the raised surfaces 120A, 120B. Regardless, the designated raised surfaces 120A, 120B efficiently provide visual guidance to users to properly place adhesive strips 118A, 118B.

It is contemplated that the raised surface 120 further helps to create a non-interfering finish between the end of the base and the wall, including by lifting the plate 114 away from the wall such that the sidewalls of the housing 112 (when attached to the plate 114) is spaced from the wall a predetermined amount to not damage or otherwise modify the wall.

Figure 5:
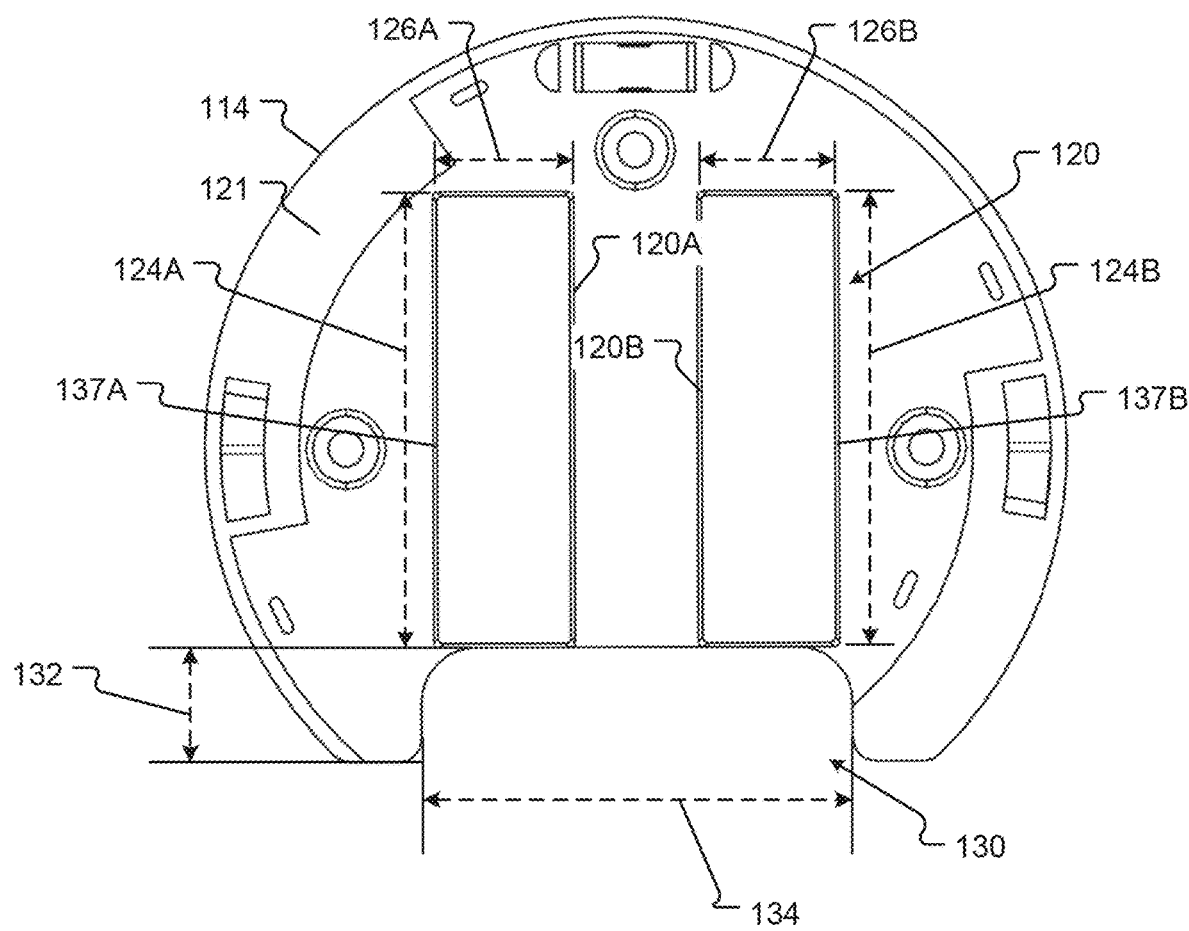
FIG. 5 is a rear view of the plate of FIG. 4, without adhesive mounting strips installed.
Figure 15:
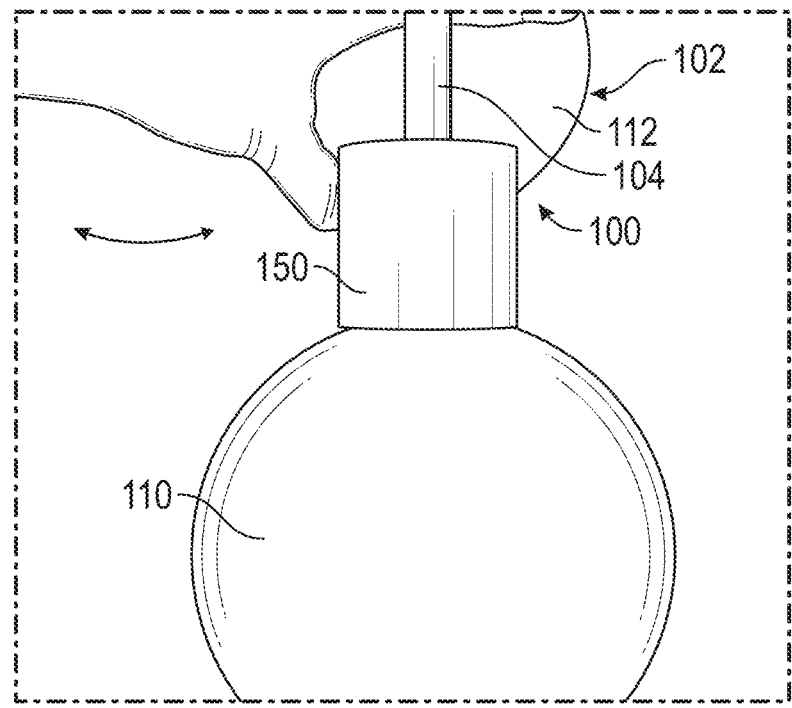
FIG. 15 is an illustration of the housing with the light shade after the housing has been rotated into place on the plate of FIG. 1A, according to the process of FIG. 9.

As shown in FIG. 5, the recessed area 125 of the plate comprises a notch 130, wherein the notch 130 includes a notch width 134 and a notch height 132. The notch width 134 spans a distance between a first edge 137A of the raised surfaces 120 and a second edge 137B of the raised surfaces 120. The notch height 132 is substantially equal to or less than a length of the tail ends 128A, 128B of the two adhesives strips 118A, 118B. The dimensions of the notch 130 are such that the tail ends 128A, 128B are accessible to a user when the housing 112 is removed from the plate 114 (as shown in FIGS. 7 and 15) and also are hidden when the housing 112 is installed on the plate 114 (as shown in FIG. 13). As shown in a comparison of FIGS. 1-3, when the housing 112 is attached to the plate 114, the housing 112 completely covers both the front and back sides 123, 121 of the plate 114 as sidewalls 127 of the housing 112 have a cross-section that is equal to or greater than a circumference of the plate 114. Consequently, the adhesive strips 118 are also hidden by the housing 112, when coupled to the plate 114. In contrast, as illustrated in FIG. 7, when the housing 112 is removed from the plate 114, the frontside 123 of the plate is exposed to the user, and the tail ends 128 of the adhesive strips 118 are visible and accessible through the notch 130. In the illustrated embodiment, when the housing 112 is removed from the plate 114, only the tail ends 128 are visible to the user and the remaining adhesive portion of the adhesive strips 118 are still hidden by the plate 114. It is appreciated that in some other embodiments, the whole or partial of the adhesive portion of the adhesive strips 118 may also be visible and accessible when the housing 112 is detached from the plate 114. The notch 130 also provides a space between the housing 112 and the wall for the tail ends 128A, 128B such that the tail ends 128A, 128B do not push against the housing 112.

During removal of the moveable light fixture 100 from a wall, the housing 112 is removed from the plate 114. After the housing 112 is removed, the tail ends 128A, 128B are exposed in the notch 130, as shown in FIG. 7. A user can pull the tail ends 128A, 128B in the direction of arrows 139 to loosen the two adhesive strips 118A, 118B from the wall and to then remove the two adhesive strips 118A, 118B and the plate 114 from the wall. In some embodiments, the frontside 123 of the plate 114 includes indicia 126. For example, the indicia 126 may include instructions for the installation and/or removal of the plate 114 from the wall. For instance, one example set of instructions may be "To Remove: Pull down slowly one at a time one the tabs below. Keep one hand firmly on the base while you pull." which describes one way to remove the plate 114 from the wall by engaging the tail ends 128A, 128B of the adhesive strips 118A, 118B. By way of another example, the indicia 126 may be a logo of the manufacturer or seller, or other information related to the light fixture 100.

As illustrated in FIGS. 8A-8D, a lighting element 136 (e.g., a disposable lightbulb, Light Emitting Diodes (LEDs), or any other light producing element) may be positioned within the light shade 110 (e.g., where the light shade 110 at least partially surrounds the lighting element 136) or proximate to an end of the light shade 110 (e.g., where the light element 136 shines into the light shade 110).

Also as illustrated in FIGS. 8A-8D, a diffuser 138 may optionally (e.g., alternatively or in addition) be installed within the light shade 110, and be coupled to the light shade 110 via an interlocking assembly. In embodiments, the diffuser 138 may include one or more tabs or protrusions 140 that engage one or more corresponding recesses 142 on a neck 144 of the light shade 110. It is contemplated that the arrangement of protrusions 140 and recesses 142 may be reversed on the diffuser 138 and the neck 144, however, without departing from the scope of the present disclosure. In addition, it should be understood that the diffuser 138 may be coupled to the light shade 110 via another interlocking system such as threading or an adhesive, without departing from the scope of the present disclosure.

In embodiments, the neck 144 is couplable to a collar 150 via an interlocking assembly. For example, the neck 144 may include one or more additional recesses 146 that engage one or more corresponding tabs or protrusions 148 on the collar 150 operable to receive the light shade 110. In some instances, the collar 150 is located at or proximate to the second end 108 of the optional arm 104. In other instances, the collar 150 is located on the base 102 (e.g., on a housing 112, as described in detail further herein). It is contemplated that the arrangement of recesses 146 and protrusions 148 may be reversed on the neck 144 and the collar 150, however, without departing from the scope of the present disclosure. In addition, it should be understood that the neck 144 may be coupled to the collar 150 via another interlocking system such as threading or an adhesive, without departing from the scope of the present disclosure.

Although embodiments illustrate a two-tier attachment system with interlocking assemblies between the diffuser 138 and the neck 144, and between the neck 144 and the collar 150, it should be understood that the diffuser 138 may also couple directly to the collar 150 via an interlocking assembly without departing from the scope of the present disclosure.

To assist with heat regulation, in some embodiments the diffuser 138 may optionally include one or more grooves 152 that allow for air circulation without impacting the diffusion of light from the lighting element 136. For example, the lighting element 136 may produce heat when confined within the diffuser 138, that may build up and cause damage to the diffuser 138 and/or other components of the lighting fixture 100, without the inclusion of the grooves 152.

Although embodiments of the present disclosure are directed to the lighting element 136 being within the light shade 110, it should be understood that the lighting element 136 may shine directly from the housing 112, either with or without a diffuser 138, without the need for a light shade 110 that at least partially encompasses the lighting element 136. In this regard, the use of the light shade 110 is merely exemplary, and should be interpreted as being limiting on the present disclosure.

It should be understood that any representation of the light shade 110, either with or without the seam 109, may be usable with any embodiment of the lighting fixture 100, as described throughout the present disclosure. For example, the light shade 110 with the seam 109 may also include the neck 144 to couple to the collar 150, and vice versa, to provide an increased number of access options to the lighting element 136 and/or the diffuser 138 to a user without departing from the scope of the present disclosure.

Figure 9:
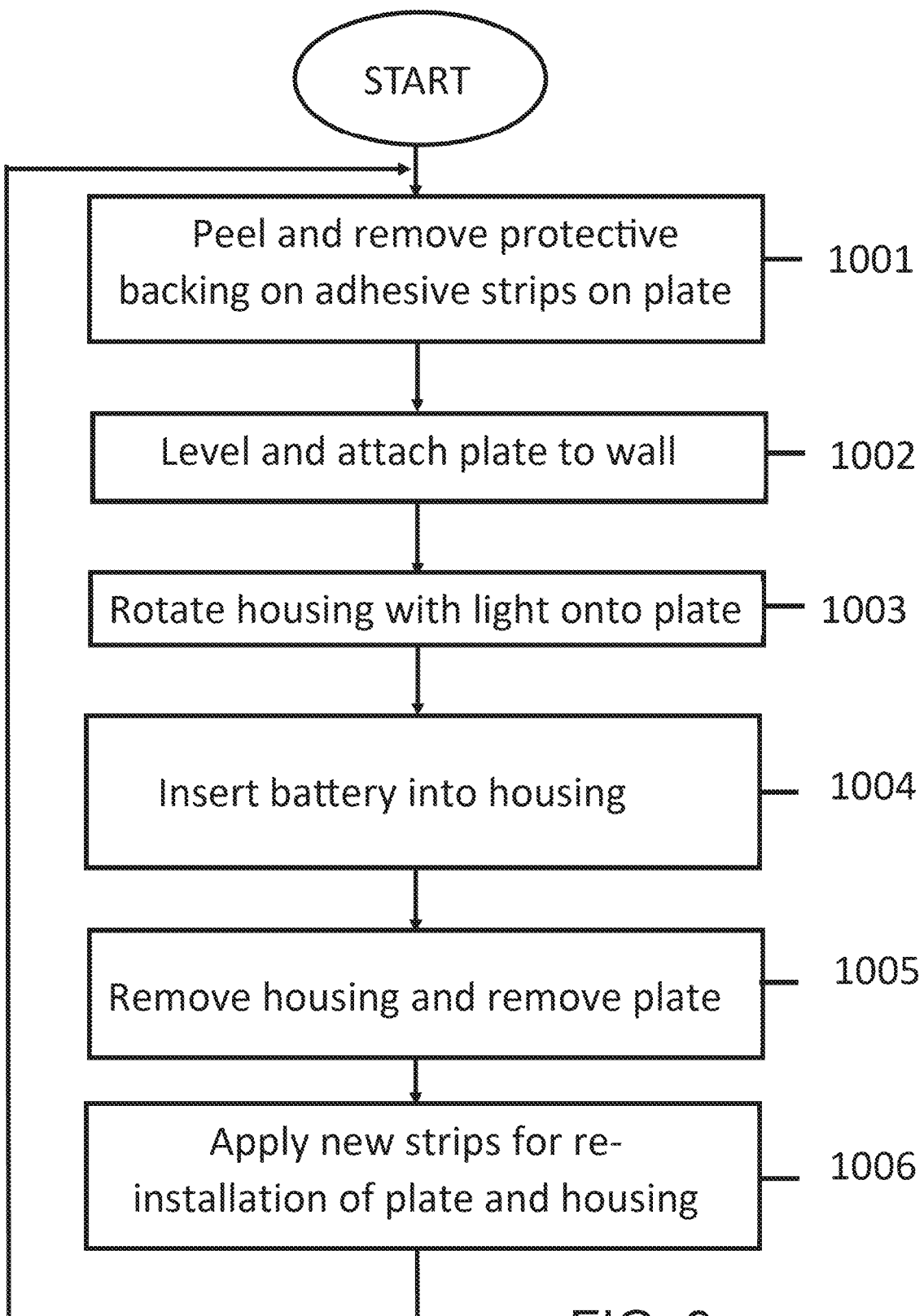
FIG. 9 is a flowchart of a process to mount and then move the moveable light fixture to one or more different locations, according to at least one embodiment of the present disclosure.

FIGS. 9-18 illustrate mounting and moving the moveable light fixture 100 to one or more different locations. In particular, FIG. 9 is a flowchart describing the steps shown in FIGS. 10-18 to mount and then move the moveable light fixture 100 to one or more different locations over time as desired.

Figure 10:
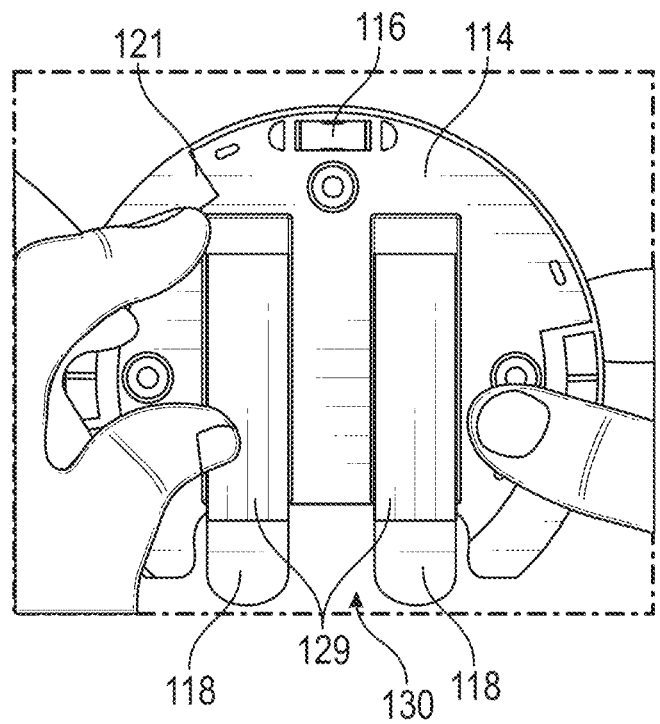
FIG. 10 is an illustration of a backside of the plate, a backside of a level and adhesive strips with protective backing of FIG. 1A, according to the process of FIG. 9.
Figure 11:
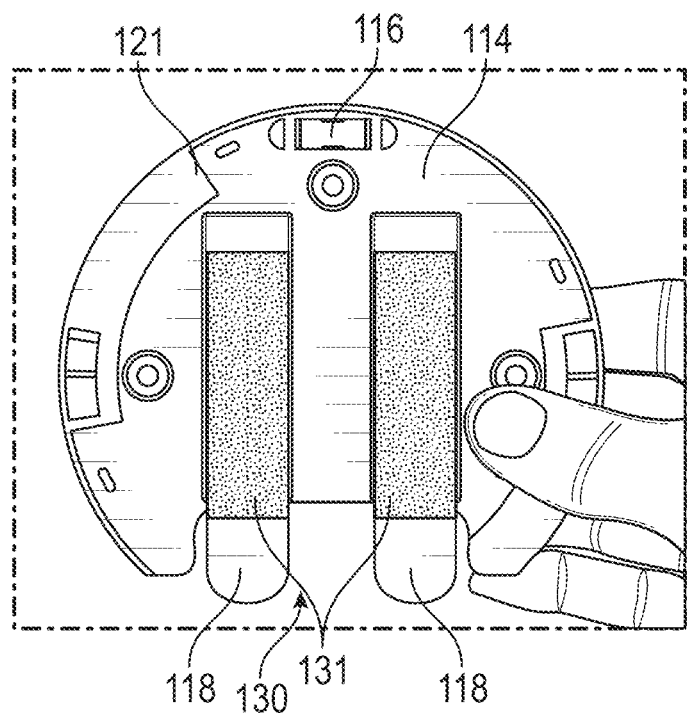
FIG. 11 is an illustration of the backside of the plate, the backside of the level and the adhesive strips with the protective backing removed of FIG. 1A, according to the process of FIG. 9.

In FIGS. 10 and 11, backing of the adhesive strips 118 are peeled and removed 1001 from the plate 114. The plate 114 may be made of any material including, but not limited to, a lightweight material such as a hard plastic or a lightweight metal, such as aluminum. FIG. 10 is an illustration of a backside 121 of the plate 114, a backside of the level 116 and two adhesive strips 118, which are two double-sided sticky tapes with protective backing 129. FIG. 11 is an illustration of the backside 121 of the plate 114, the backside of the level 116 and two adhesive strips 118 without protective backing 129 that has been removed to expose an adhesive surface 131. Removing the protective backing 129 from the adhesive strips 118 prepares the adhesive strips 118 to be pressed against a wall at a desired location to attach the plate 114 to the wall.

FIGS. 12 and 13 are an illustration of the frontside 123 of the plate of the mounting base 102 where the backside 121 of the plate 114 is mounted to a wall. In FIG. 12, the plate 114 is leveled 1002 against a wall, prior to pressing on the plate 114 to attach the adhesive strips 118 to the wall. using a built-in level before being firmly pressed to the wall. A portion (e.g., the tail-end 128) of each of the two adhesive strips 118 may extend into the notch 130 or the window formed in the bottom of the plate 114. This exposes part of the adhesive strips 118 so that when the moveable light fixture 100 needs to be moved, the two adhesive strips 118 may be pulled on to release their adhesives from sticking to the wall. In the illustrated embodiment, the two tail ends 128 are extended into the notch 130 and exposed to the user. The user may pull the tail ends 128 to remove the plate 114 from the wall.

FIG. 12 also illustrates the leveling of the plate 114, prior to pressing of the plate 114 on the wall to cause the exposed adhesive surfaces 131 to stick to the wall. As shown in FIG. 12, to level the plate 114, a user will first hold the plate 114 against the wall without attaching the housing 112 to the plate 114. When the housing 112 is detached from the plate 114, the level 116 is exposed and visible to the user. The user may rotate and/or otherwise move the plate 114 while referring to the level 116 to adjust the orientation of the plate 114, ensuring the levelness (or any desired orientation) of the plate 114 on the wall.

Figure 17:
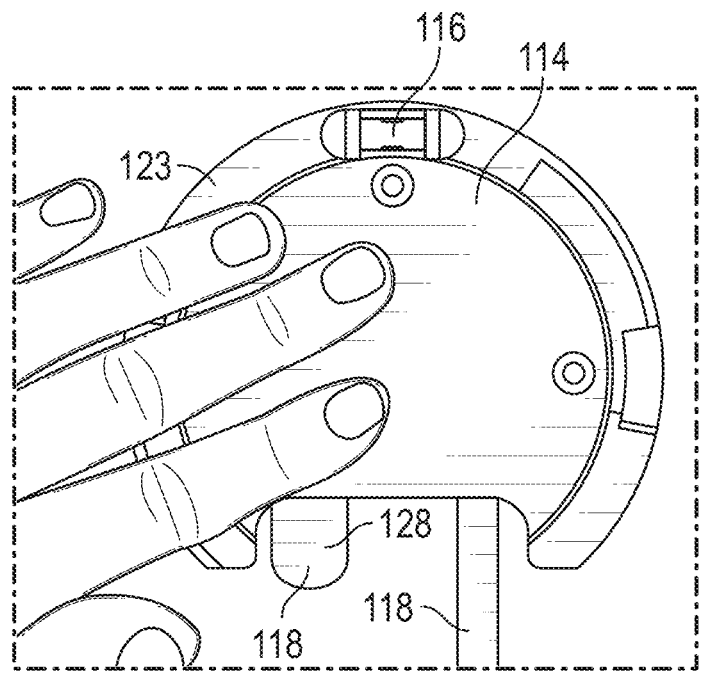
FIG. 17 is an illustration of the base with the housing removed and an adhesive strip being stretched so that the plate is dismounted from the wall of FIG. 1A, according to the process of FIG. 9.
Figure 18:
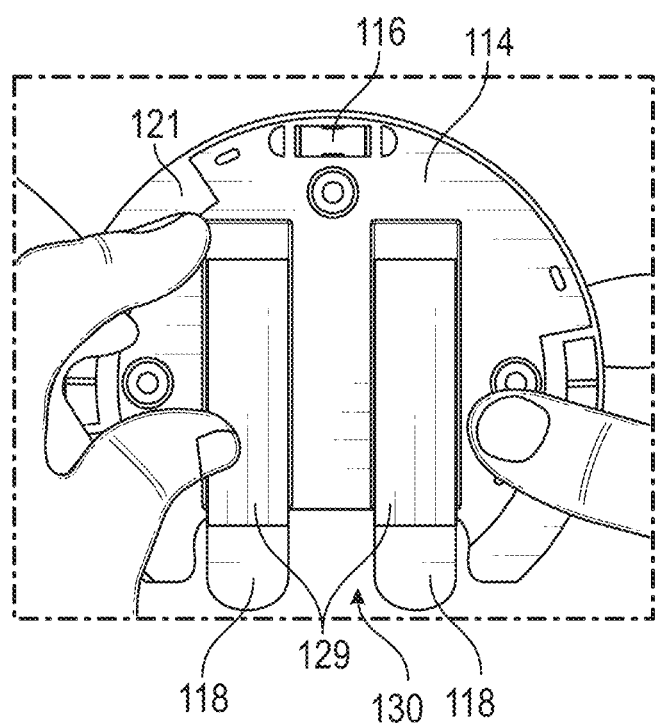
FIG. 18 is an illustration of the plate after new adhesive strips have been applied to the backside of the plate of FIG. 1A, according to the process of FIG. 9.

Once the plate 114 is adjusted to the desired position and orientation (e.g., by reviewing the level 116), the user may then secure the plate 114 by pressing the plate against the wall. By applying a pressing force on the plate 114 against the wall, the adhesive surface 131 will adhere to the wall, consequently secure the plate to the wall. As shown in FIGS. 13, the user may then release hands from the plate 114, and the tail ends 128 of the adhesive strips 118 remain visible to the user. In a case where the user is not satisfied with the positioning of the plate, the user may pull the tail ends 128 to release the plate 114 from the wall (e.g., as illustrated in FIG. 17). After application of new adhesive strips 118 (e.g., as illustrated in FIG. 18), the user may repeat the leveling and securing steps until the plate 114 is secured at a desired position and orientation.

Figure 14:
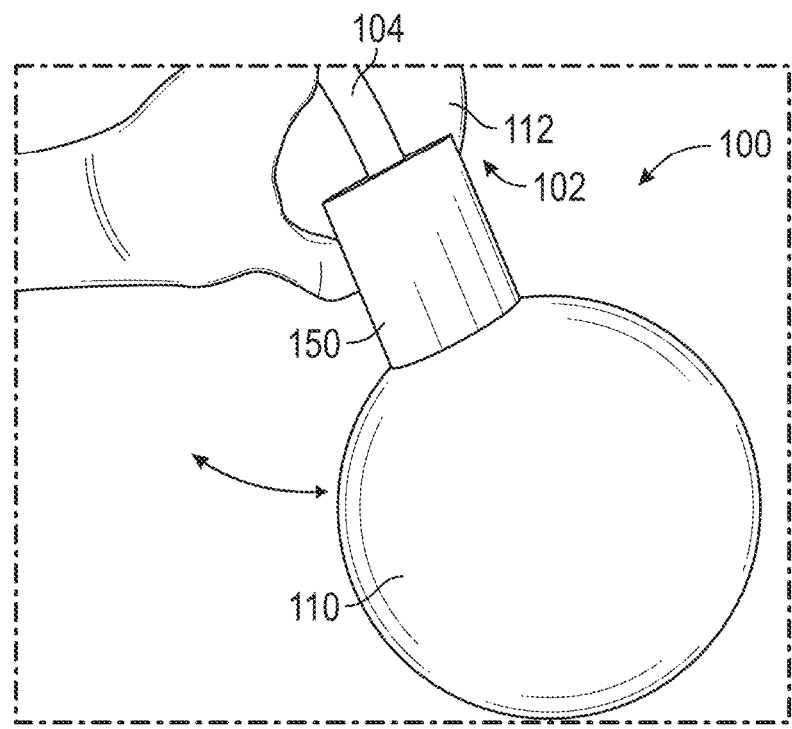
FIG. 14 is an illustration of a housing with a light shade being placed on the plate of FIG. 1 prior to being rotated into place, according to the process of FIG. 9.

In FIGS. 14 and 15, the housing and light shape are rotated 1003 into the place attached to the plate 114. Rotation of the housing 112 onto the plate 114 causes the apertures 117 on the housing 112 to engage the tabs or protrusions 115 of the plate 114 (not shown). Optionally, the tab or protrusion 115 of the plate 114 may act like a nut (or bolt) with threads to receive a corresponding catch, ledge or bolt (or nut) with threading that is a part of the housing 112.

FIG. 14 is an illustration of the housing 112 with light shade 110 and optional arm 104 being placed on the plate 114 prior to being rotated into place. FIG. 15 is an illustration of the housing 112 with light shade 110 and optional arm 104 mounted on the plate 114 after the housing 112 has been rotated into place. In the illustrated embodiment, the user rotates the housing 112, along with the optional arm 104 and the light shade 110, onto the plate 114. It is appreciated that in other embodiments, a housing, an optional arm, and a light shade may each be installed separately onto the plate 114, without departing from the scope of the present disclosure. For example, a user may attach the housing 112 to the plate 114 first, attach the optional arm 104 to the housing 112, and then install the light shade 110. By way of another example, a user may attach the housing 112 to the plate 114 first, and then install the light shade 110 directly. It is also appreciated that in some other embodiments, the attaching step may involve pushing, clipping, threading, and other applications of force by a user.

Figure 16:
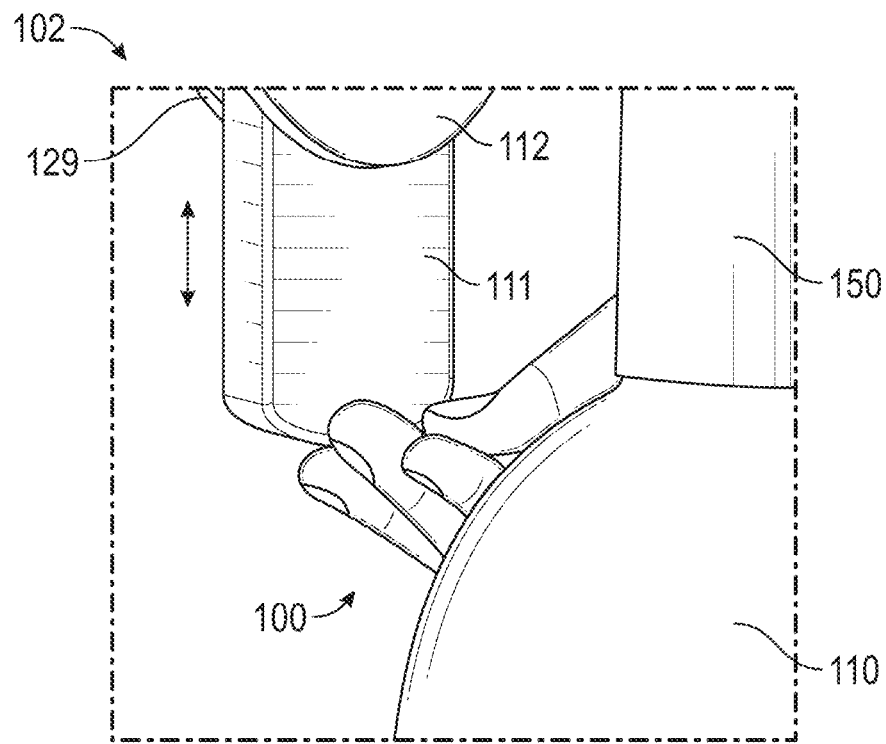
FIG. 16 is an illustration showing a battery being inserted or removed from a housing of FIG. 1A, according to the process of FIG. 9.

In FIG. 16, the battery 111 (e.g., which may include one or more rechargeable batteries, or which may include a cradle for one or more disposable batteries), is inserted 1004 into the housing 112. FIG. 16 is an illustration showing a battery 111 being inserted or removed from the housing 112. In the illustrated embodiment, the housing 112 comprises a battery slot 113 at the edge of the housing 112 in the sidewall 127. The user inserts the battery 111 into the battery slot 113 after the housing 112 is attached to the secured plate 114 on the wall. In some other embodiments, users may insert a battery 111 into a housing 112 before attaching the housing 112 to a plate 114.

If the moveable light fixture 100 needs to be moved after being attached to the wall, the light shade 110 and the housing 112 may be de-rotated and removed 1005 from the plate 114. FIG. 17 is an illustration of the plate 114 after mounting, with the light shade 110 and the housing 112 removed and the right adhesive strip 118 being stretched so that the right double-sided sticky tape no longer holds the plate 114 to the wall. A similar process may be applied to the left adhesive strip 118 to fully remove the plate 114 from the wall. FIG. 17 illustrates the right side adhesive strip 118 being stretched to detach the right side adhesive strip 118 from the wall. The process may be repeated for the left side adhesive strip 118, i.e., the left side adhesive strip 118 may be stretched to detach the left side adhesive strip 118 from the wall. Once both adhesive strips 118 have been stretched, the plate 114 may be easily removed from the wall and moved to a different location.

New adhesive strips 118 may be applied 1006 to the backside of the plate 114, as illustrated in FIG. 18. FIG. 18 is an illustration of the backside 121 of the plate 114 after two new adhesive strips 118 with protective backing 129 have been applied to the backside 121 of the plate 114. After removing the old pair of adhesive strips 118 from the wall, the stretched adhesive strips 118 will at least partially lose its adhesive feature, and the user may then remove the non-adhesive strips from the plate 114. When the user wants to install the plate 114 again, the user may then add a new pair of adhesive strips 118 to the plate 114, and repeat the installation steps as discussed above. The process of moving and attaching the moveable light fixture 100 to different locations may be repeated as many times as desired.

Although embodiments of the present disclosure are directed to installation on a wall or ceiling of a home or business, it should also be appreciated that the light fixture 100 may be installed on any surface with a planar area that is at least the dimensions of the contact area of an adhesive strip 118, without departing from the scope of the present disclosure. For example, the light fixture 100 may be installed in or on a shed or garage, in or on a cabinet, cupboard, wardrobe, hutch, or other large piece of furniture, in or on a camper, in a tent with a sufficiently rigid interior or exterior surface, on the understood of a vehicle hood or trunk, or on any surface where additional light would be desired by a user.

Figure 19A:
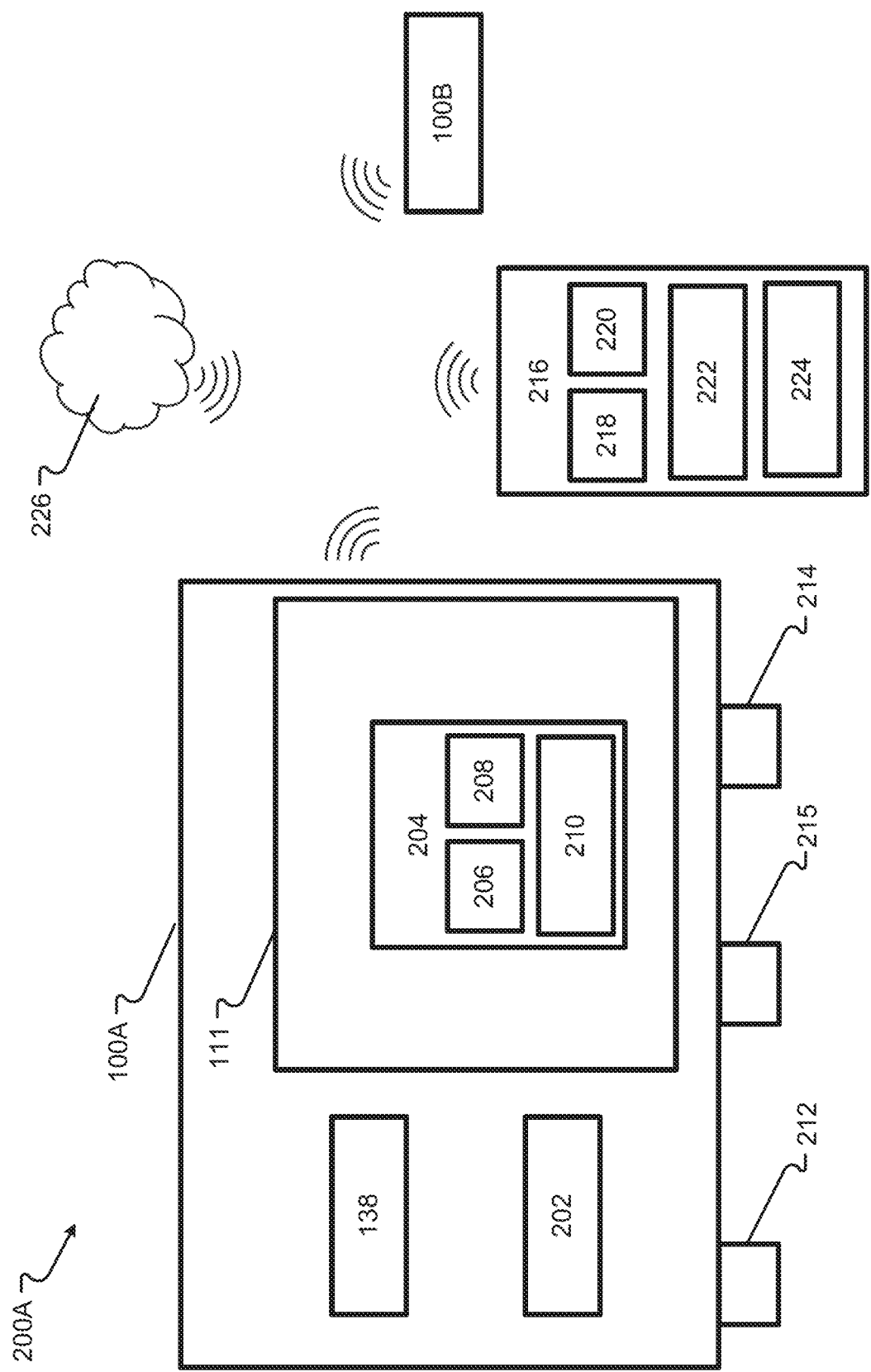
FIG. 19A is a block diagram of a control system for one or more lighting fixtures of FIG. 1, according to at least one embodiment of the present disclosure.
Figure 19B:
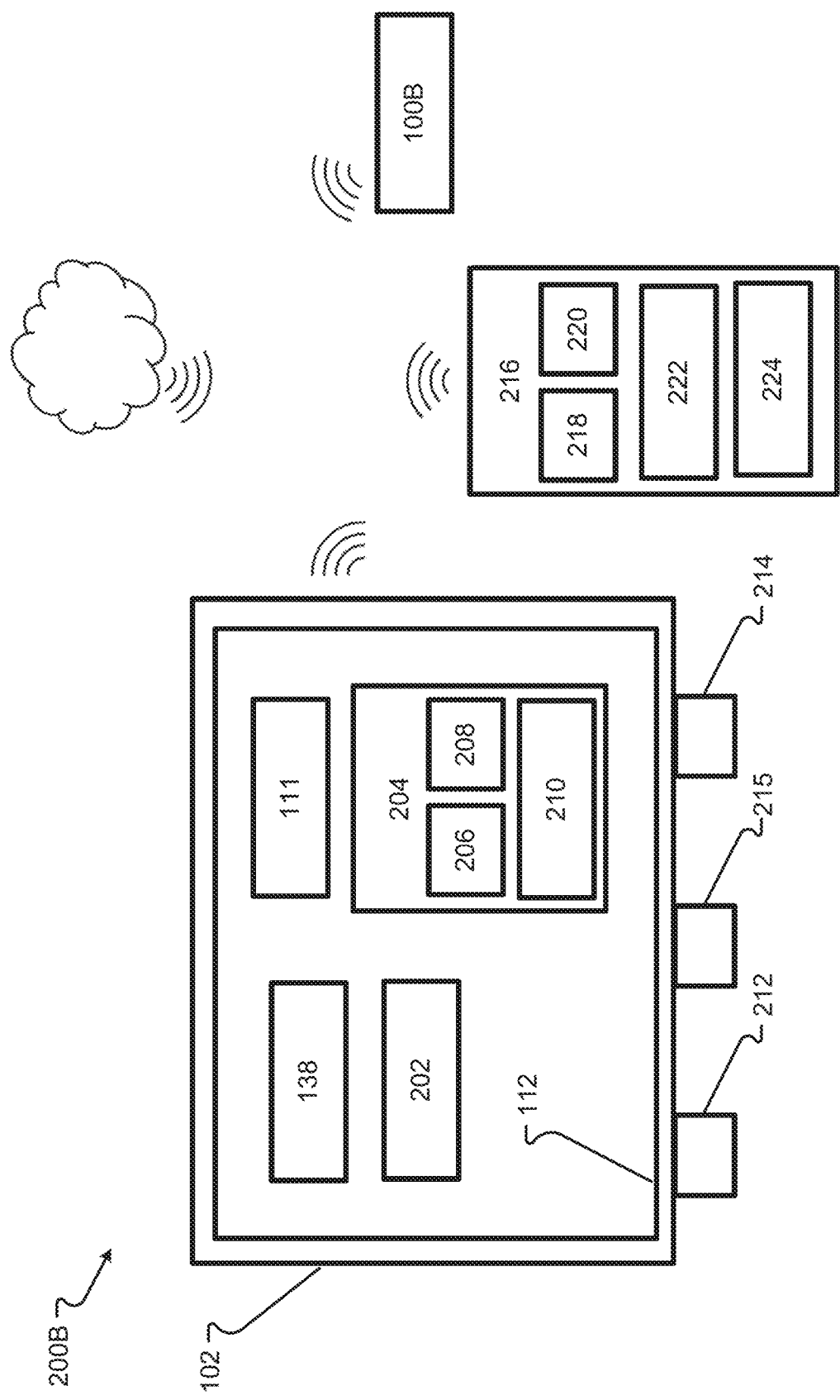
FIG. 19B is a variation of the block diagram of FIG. 19A of a control system for one or more lighting fixtures of FIG. 1A, according to at least one embodiment of the present disclosure.

In embodiments, an application, i.e., software program, may be run on an electronic device such as a smart phone to control one or more moveable light fixtures 100. It should be appreciated that the application may be run on other types of electronic devices, such as a computer, lap top or other types of mobile electronic devices. FIGS. 19A and 19B illustrate variations of a control system 200 including a light fixture 100A, a controller 216, and an optional light fixture 100B. It should be understood that the light fixture 100B may be configured similar to or different from the light fixture 100A as illustrated in FIGS. 19A and 19B.

In FIG. 19A, the light fixture 100A includes the battery 111, the lighting element 136, and optionally one or more sensors 202. The one or more sensors 202 may be operable to determine various operational, physical, and/or environmental parameters of the light fixture 100A and/or the control system 200A, 200B; the environment surrounding the light fixture 100A and/or the control system 200A, 200B; and the like. For instance, the one or more sensors 202 may collect data on the operation and/or status of the light fixture 100A.

The battery 111 includes a circuit board 204. For example, the circuit board 204 may be a component of, or include, a printed circuit board (PCB). In some instances, the circuit board 204 includes a potentiometer 206 and/or any other electronics component 208 for operating the lighting element 136 (e.g., controlling a brightness of an output, and/or where the output is occurring). For example, the potentiometer 206 and/or other electrical components 208 may be installed on the circuit board 204. In embodiments, the one or more sensors 202 are in communication with the circuit board 204 (or are installed on the circuit board 204), without departing from the scope of the present disclosure.

The circuit board 204 may additionally include a transmission/receiving (Tx/Rx) unit 210 operable to receive signals to operate the light fixture 100 and/or transmit data about the operation or status of the light fixture 100. It should be understood that the Tx/Rx unit 210 may be a separate component within the battery 111 in communication with the circuit board 204, without departing from the scope of the present disclosure.

In embodiments, the light fixture 100 includes a manual toggle 212 (e.g., button, switch, knob, dial, or the like) to control the operation of the light fixture 100A. For example, the manual toggle 212 may be in communication with the potentiometer 206, or the like.

In embodiments, the light fixture 100 includes a USB or charging port 214 to charge the battery 111 while installed within the light fixture 100A. The charging port 214 may include (or be in communication with) an indicator light 215, either installed on a circuit board 204 (e.g., as described in detail further herein) or installed as a standalone element within the battery 111 (e.g., that is optionally in communication with the circuit board 204). The indicator light 215 may provide an indication of charge status of the battery 111. For example, the indicator light 215 may show when the battery 111 is depleted, nearly depleted, charging, nearly charged, and charged. By way of another example, the indicator light 215 may utilize lights of one or more colors and/or one or more patterns of lights when making the indication. In additional or alternative embodiments, the battery 111 may include one or more aural indicators that emit one or more frequencies and/or one or more patterns of frequencies at one or more volumes to provide an indication of charge status of the battery 111. In further additional or alternative embodiments, the battery 111 may include a display or other user interface that illustrates one or a series of graphical user icons (GUIs) to provide an indication of charge status of the battery 111.

It should be understood that, where the battery 111 is charged with a cradle or an induction charging base, the cradle or induction charging base may include the indicator light, aural indicator, and/or display or other user interface to provide an indication of charge status of the battery 111, without departing from the scope of the present disclosure.

In some non-limiting examples, as illustrated in FIG. 8A, the charging port 214 is in the battery 111 (e.g., within an exterior surface 141 of the battery 111 such as a surface that is pointed substantially downward toward a ground surface, or in general in a direction toward a wall outlet). In other non-limiting examples, the charging port 214 may generally be in the housing 112 (e.g., within an exterior surface such as a sidewall 127 or an endwall or end face). It is noted that the circuitry of the light fixture 100A may be designed to allow the light fixture 100A to run on direct power from the charging port 214 either with or without the battery 111 installed in the light fixture 100A, without departing from the scope of the present disclosure.

The potentiometer 206 (or any switching device within the light fixture 100A, in general) may be controlled through an application run on a controller 216 such as, for example, a smart phone, a tablet, a computer, or the like. The controller 216 includes processors 218 and memory 220 The processors 218 may be configured to execute program instructions maintained on or stored in the memory 220. The processor 218 of the controller 216 may execute any of the various method or process steps necessary to operate the light fixture 100A. The memory may be non-transitory memory.

The controller 216 may include a user interface 222. For example, the user interface 222 and the controller 216 may be located within a common or shared housing. By way of another example, the user interface 222 may be a separate device coupled (e.g., physically coupled, electrically coupled, communicatively coupled, or the like) to the controller 216. The user interface 222 may include one or more visual, aural, or tactile outputs (e.g., a display), one or more visual, aural, or tactile inputs (e.g., user input devices), and/or one or more port connectors (e.g., for the transmitting and/or receiving of power and/or data, and the like).

The controller 216 may include a Tx/Rx unit 224 for communication with the light fixture 100A. The Tx/Rx unit 210 of the light fixture 100A and/or the Tx/Rx unit 224 of the controller 216 may include one or more transmitters and/or receivers coupled (e.g., physically coupled, electrically coupled, communicatively coupled, or the like) to or integrated in the light fixture 100A (e.g., in the battery 111) and/or in the controller 216, respectively. The one or more transmitters and/or receivers may be configured to transmit data to and/or receive data from the light fixture 100A and/or the controller 216, either directly or indirectly through additional controllers or a server or other network component 226 (e.g., a Wi-Fi router, or the like). or from other control units (e.g., additional controllers, or the like) either via wired connections or wireless connections (e.g., Wi-Fi, Bluetooth, near-filed communication protocols, or the like). The Tx/Rx units 210, 224 may be configured as transmitting (Tx) units, receiving (Rx) units, or combination Tx/Rx units.

The controller 216 may be configured to monitor and/or control the light fixture 100A via received and/or transmitted data. The controller 216 may be configured to generate control signals to adjust one or more components of the light fixture 100A (e.g., increase or decrease brightness, put the lighting element 136 on a timer, or the like) via a feedback loop or a feed forward loop based on the received and/or transmitted data. The light fixture 100A and/or the controller 216 may be configured to receive and/or transmit data in a standardized format and/or a non-standardized format. Where the data is in a non-standardized format, the data may be converted to a standardized format upon receipt and/or prior to transmission to sensors, other control units, or the like.

The battery 111 shown in the example is an interchangeable and rechargeable battery with a unique identification number (unique ID) as part of the Tx/Rx unit 210 or on a near-field communication (NFC) tag, a radio frequency identification (RFID) chip, or the like. The unique ID is connectable and recognizable within the control system 200 (e.g., by the controller 216). Consequently, when connected to a control application 1100 or application interface 1100 (e.g., as shown in FIGS. 20-54), the unique ID or other representative information corresponding to the unique ID such as a defined name will be recognized and displayed on the control application 1100 to allow users to select a specific light fixture 100 for management.

FIG. 19A illustrates a control system 200A with the circuit board 204 with Tx/Rx unit 210 within the battery 111, such that interchanging the battery 111 also changes the unique ID for the light fixture 100A. FIG. 19B illustrates a control system 200B for a variation of the light fixture 100A, however, where the circuit board 204 and the Tx/Rx unit 210 are installed within the housing 112 of the base 102, such that interchanging the battery 111 does not change the unique ID for the light fixture 100A. The control application 1100 on the controller 216 may be operable for either arrangement of components and subsequent signal processing and generation, without departing from the scope of the present disclosure.

As one or more embodiments of the present disclosure are described as being operable on or with a circuit board 204 and/or a controller 216 (e.g., including, but not limited to, via the control application or application interface 1100), it should be understood that the one or more embodiments of the present disclosure should be considered as being directed to a computer-implemented invention and/or as being directed to a computer-implemented method.

Although embodiments of the present disclosure are directed to a light fixture 100 and other lamp-based technologies, it should also be appreciated that the interchangeable (and optionally rechargeable) battery 111 can also be arranged in other battery-powered devices including, but not limited to handheld transceivers, power tools, portable speakers, home décor items (e.g., clocks, speakers, radios, alarms, smart assistants, air purifiers, fans, humidifiers, dehumidifiers, wall-mount and window-mount air conditioners, space heaters, wall-mounted HVAC controls, hand-drying stations, soap dispensers, electric fireplaces, weather and environment monitoring displays with external sensors, televisions, digital frames and artwork, and the like) laptops or desktops, workstations, routers, ink or toner printers, scanners, additive manufacturing devices such as three-dimensional (3D) printers, electrical bicycles, digital cameras, smoke detectors, kitchen appliances, or any battery-powered device that may be configured to receive an interchangeable and rechargeable battery 111 and that can be controlled by a controller 216. Because the unique ID is assigned to the battery (and, in general, to a particular battery-powered device), the control application 1100 will also be operable to individually control any battery-powered devices with the rechargeable battery 111.

FIGS. 20-54 generally illustrate an application interface 1100 for remote control and adjusting the settings of the light fixture 100, in accordance with one or more embodiments of the present disclosure. In the illustrated embodiment, the application interface 1100 is displayed on a controller 216 such as a smartphone, as part of the control system 200A from FIG. 19A (or the control system 200B of FIG. 19B, without departing from the scope of the present disclosure). It is appreciated that application interface 1100 may be displayed on other controllers 216, including but not limited to personal computers and tablets. It should be understood that the various embodiments for the application interface 1100 illustrated in FIGS. 20-54 are merely exemplary of the possible features of the application interface 1100, and are not intended to be limiting on the features or operation of the application interface 1100. In addition, although FIGS. 20-54 reference a "Poplight" (or, in general, a lighting fixture 100), it should be understood that the application interface 1100 may be usable for any battery-powered device such as those described in the previous paragraph.

It should be understood that various figures of FIGS. 20-54 (e.g., FIGS. 32-36, 39, and 43-45) illustrate broken lines that are intended to represent a selection made on the application interface 1100. As such, the broken lines are merely illustrative, and are not intended on being limiting on the present disclosure.

Figure 20:
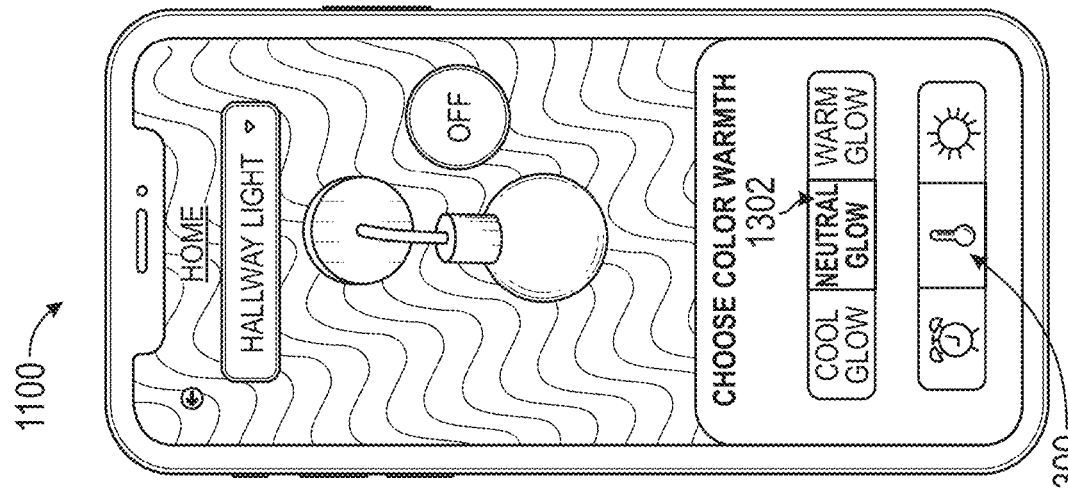
FIG. 20 is an application interface that may be used to turn a light on and/or off, for use with the control system of FIG. 19A.
Figure 21:
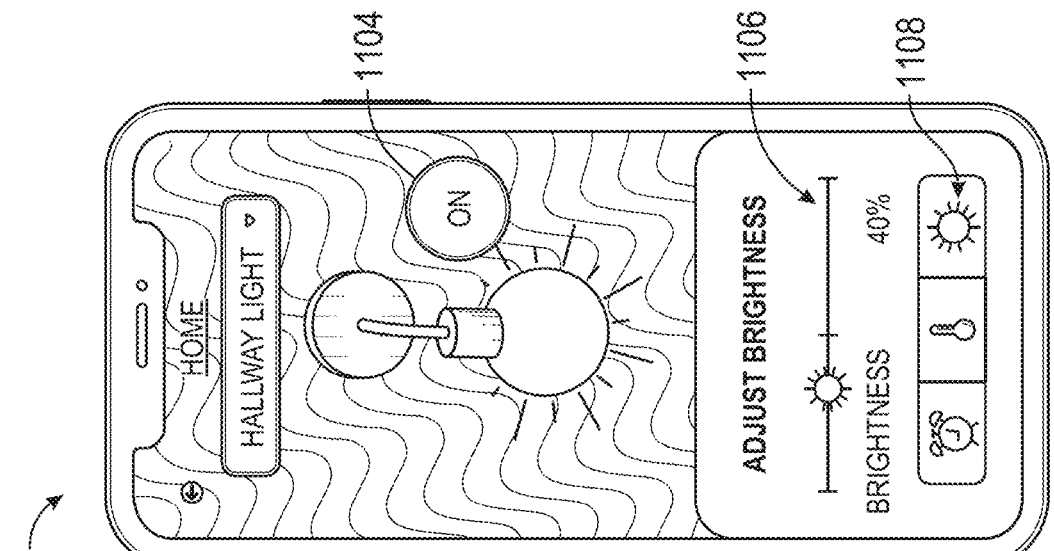
FIG. 21 is an application interface that may be used to adjust a brightness of a light, for use with the control system of FIG. 19A.
Figure 22:
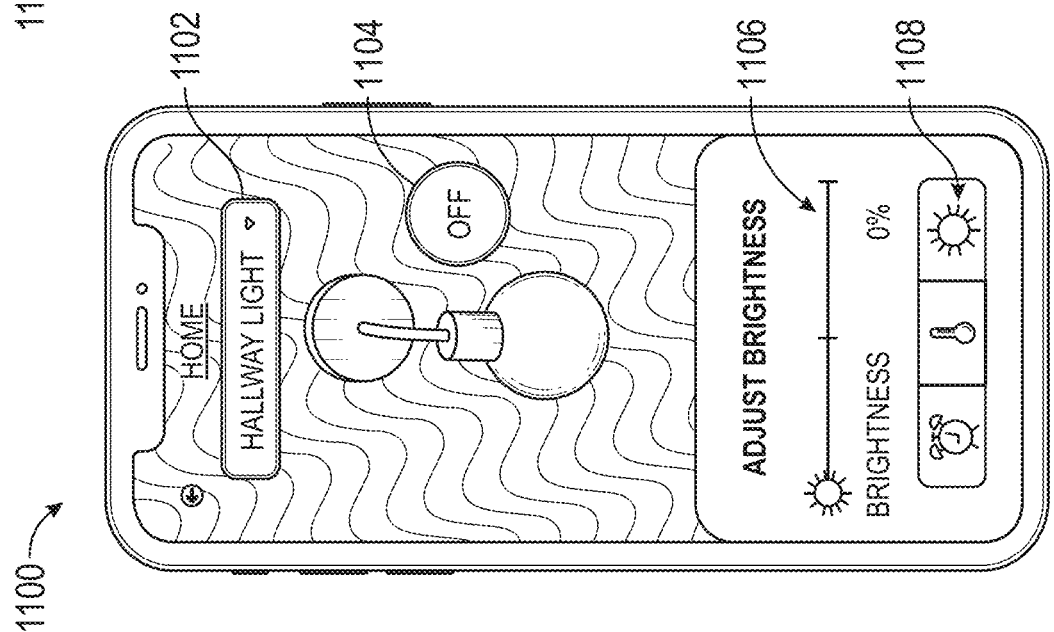
FIG. 22 is an application interface that may be used to select a color warmth of a light, for use with the control system of FIG. 19A.

FIGS. 20-22 illustrate an application interface of a control application 1100 that may be used to turn a light on or off and adjust its brightness. The control application, i.e., a software program, is installed in a control device, for example, a smartphone, a laptop, or a tablet. When in operation, the control application 1100 will first recognize the unique ID assigned to a battery 111 inserted into a light fixture, and a user may connect the battery 111 with the control application through, for example, a WIFI or Bluetooth connection. As a result, a user can control the battery-powered light fixture 100 through the control application 1100. In this example embodiment, a location icon 1102 is displayed on the top of the screen showing the specific light fixture currently under control. In this example, the HALLWAY LIGHT has been selected and the name is shown on the interface at 1102.

In FIGS. 20-21, the user may toggle a graphical user interface (GUI) icon (or button, for purposes of the present disclosure) representing an on and off button 1104 on the screen to control the light fixture 100. In addition, a user may select an adjust brightness icon 1108. The user may then use an adjust brightness slider 1106 to turn the light off or on (shown graphically and in writing at 1104) and control the brightness of the moveable light fixture 100. While GUI icons or buttons are illustrated on the application interface 1100, it is appreciated that the control application may also be controlled through other methods, including but not limited to voice control and hand gestures.

In FIG. 22, a user may choose light warmth through the application interface 1100. The user may also select the color warmth of light after pressing the light warmth button 1300. The user may then select desired light warmth on the light warmth bar. In the example embodiment, three types of light warmth are available: COOL GLOW, NEUTRAL GLOW, and WARM GLOW. In some other embodiments, there may be other types and themes of light warmth options available.

Figure 24:
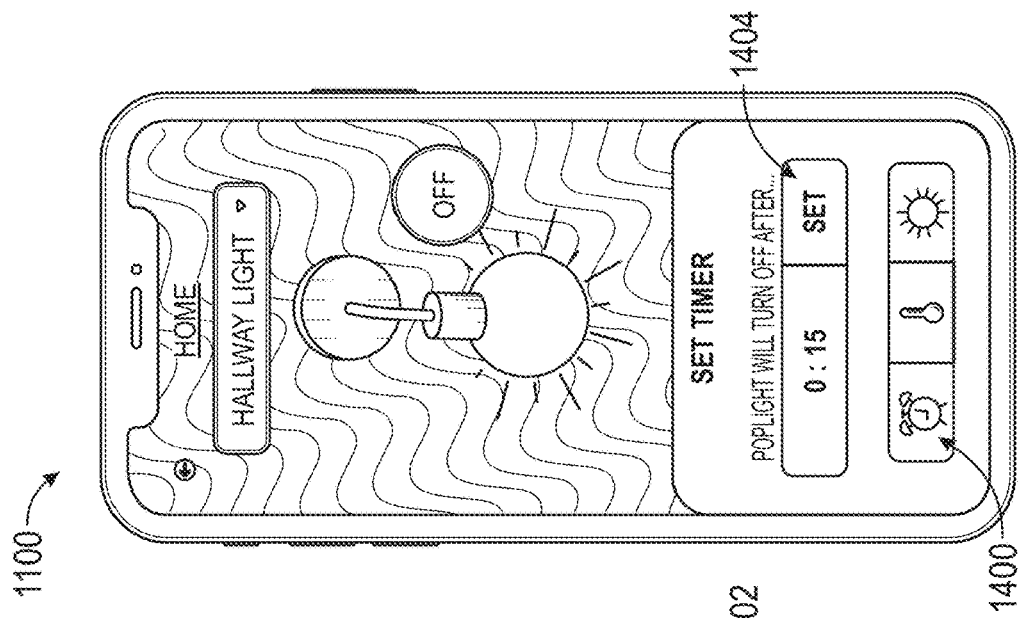
FIG. 24 is an application interface that may be used to set a timer to a custom length of time for how long a light should stay on, for use with the control system of FIG. 19A.
Figure 23:
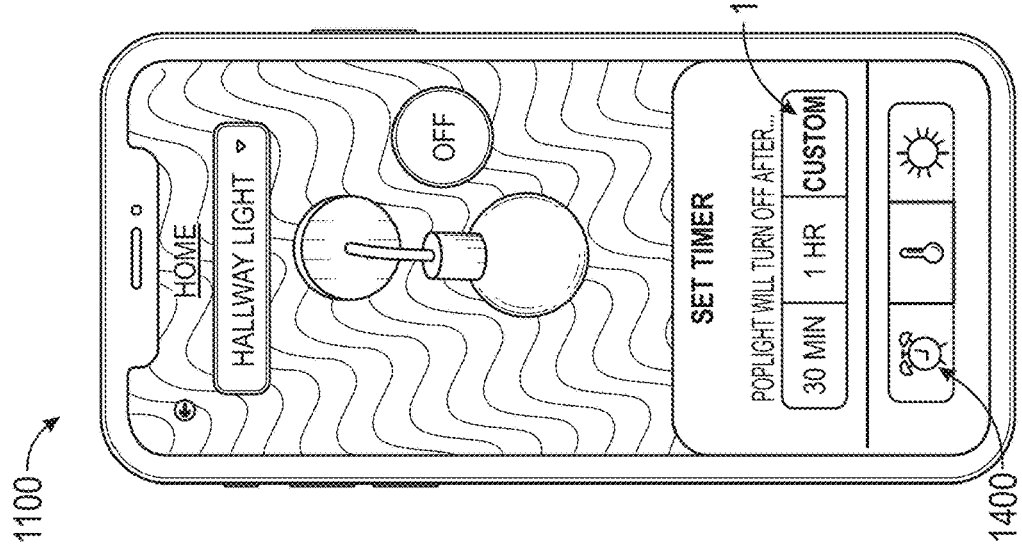
FIG. 23 is an application interface that may be used to set a timer for how long a light should stay on, for use with the control system of FIG. 19A.

FIGS. 23-24 illustrate an application interface 1100 that may be used to set a timer for how long a light should stay on. In FIG. 23, the application interface 1100 allows either a 30 minute, one hour or a custom time to be set, depending on the icon selected, wherein the 30-minute and one-hour settings are pre-programmed and the user does not need to enter the time by herself. Should the user desire other time length, the user can tap CUSTOM icon 1402 and enter the specific hour and minute numbers to set the time. In this example, icon 1402 is selected, which allows a custom time to be entered. Once the user finished entering the time, the user may set the timing by tapping the SET icon 1404. In this illustrated example shown in FIG. 24, a custom timer for 15 minutes is entered and selected on the application interface 1100.

Figure 25:
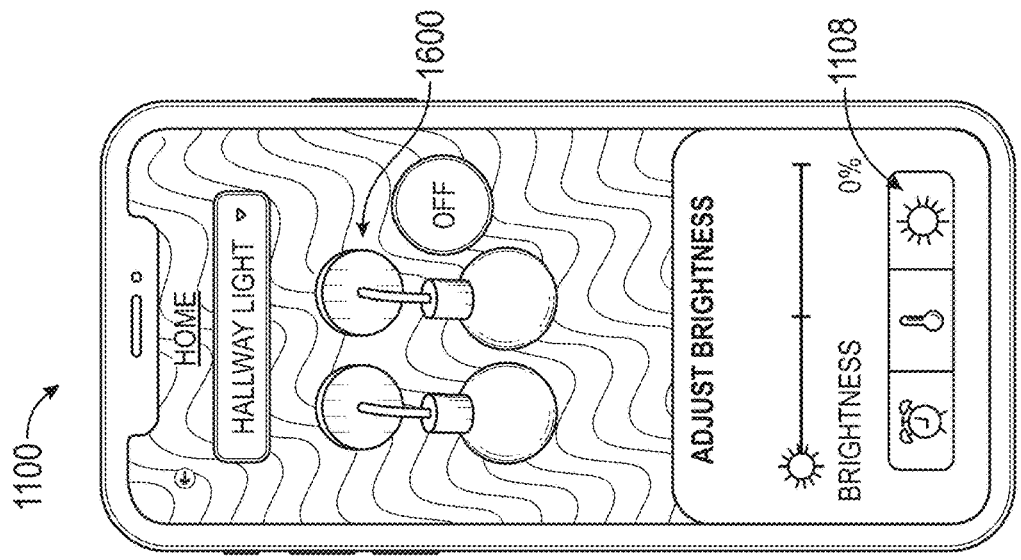
FIG. 25 is an application interface that may be used to adjust a brightness for a group of lights, for use with the control system of FIG. 19A.

FIG. 25 is an application interface 1100 that may be used to adjust a brightness for a group of lights. This capability allows for a single brightness selection to be used for one or more moveable light fixtures 100 in the same group, which are selected by the user on the application interface 1100 and determined by the controller 216 based on known unique IDs for each light fixture 100.

Figure 28:
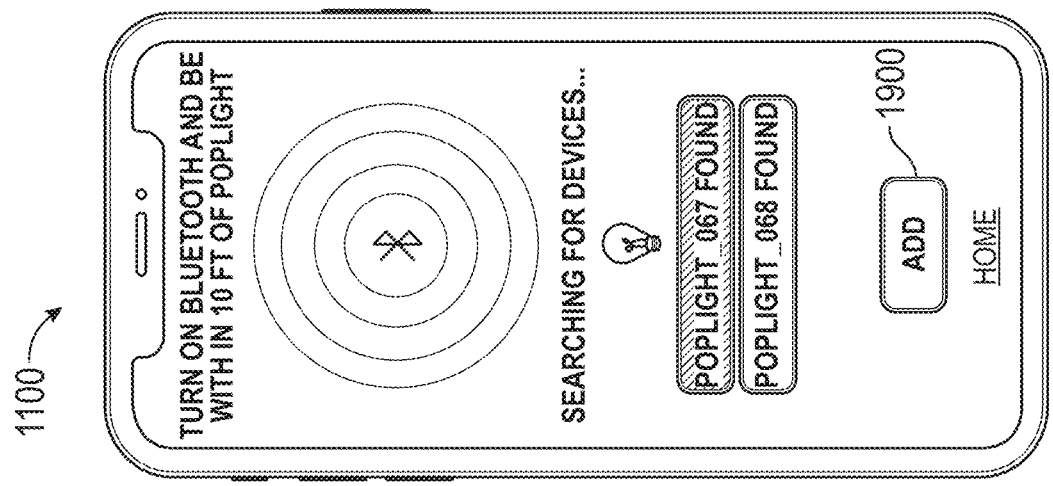
FIG. 28 is an application interface that may be used to select one of the available moveable light fixtures and add it or pair it with the electronic device, for use with the control system of FIG. 19A.
Figure 27:
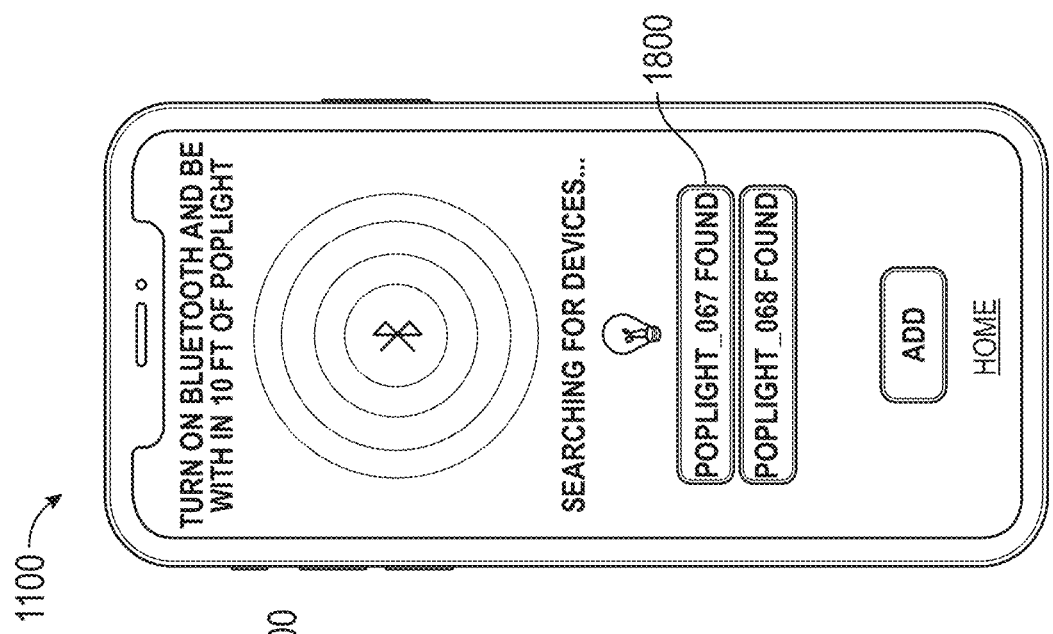
FIG. 27 is an application interface that lists one or more moveable light fixtures that may be paired via Bluetooth with the electronic device, for use with the control system of FIG. 19A.
Figure 26:
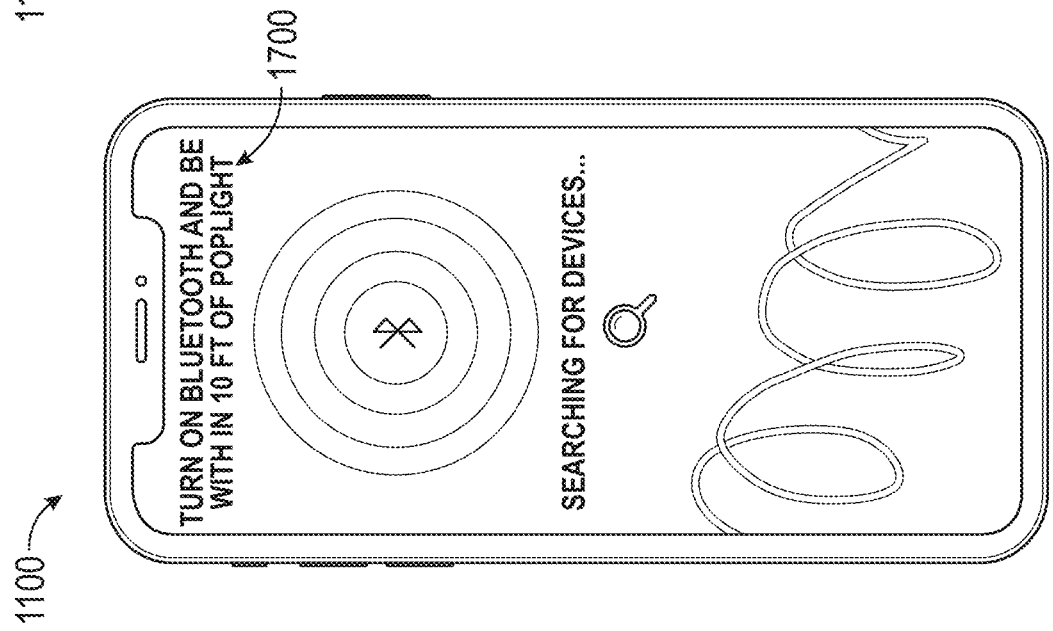
FIG. 26 is an application interface that may be used to direct a person in how to use a Bluetooth connection between an electronic device and the moveable light fixture, for use with the control system of FIG. 19A.

FIGS. 26-28 is an application interface 1100 that may be used to direct a person on how to use a Bluetooth connection between the controller 216 (e.g., such as a smart phone) and the moveable light fixture 100. In this example, the application interface 1100 directs the person to turn on Bluetooth on their electronic device and be within 10 feet of the moveable light fixture 1700. Once the Bluetooth is turned on, the control device (i.e., a smartphone) will automatically or manually search for available light fixtures that can be connected to the control device and display the names of the available light fixtures on the screen. In the example embodiment shown in FIG. 27, two available light fixtures are available, and their Unique IDs (or names) are displayed on the name banner 1800 on the application interface 1100. As shown in FIG. 28, by choosing the desired light fixture and pressing or tapping the ADD icon 1900, the user may connect the application and the light fixture and control the light fixture 100 directly from the application.

Figure 31:
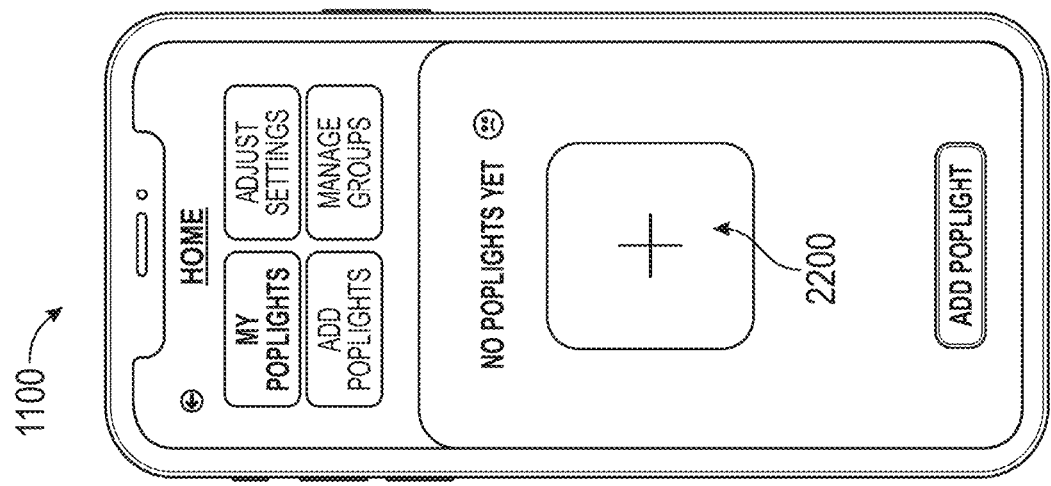
FIG. 31 is an application interface that may be used to show when no moveable light fixture has been added, for use with the control system of FIG. 19A.
Figure 30:
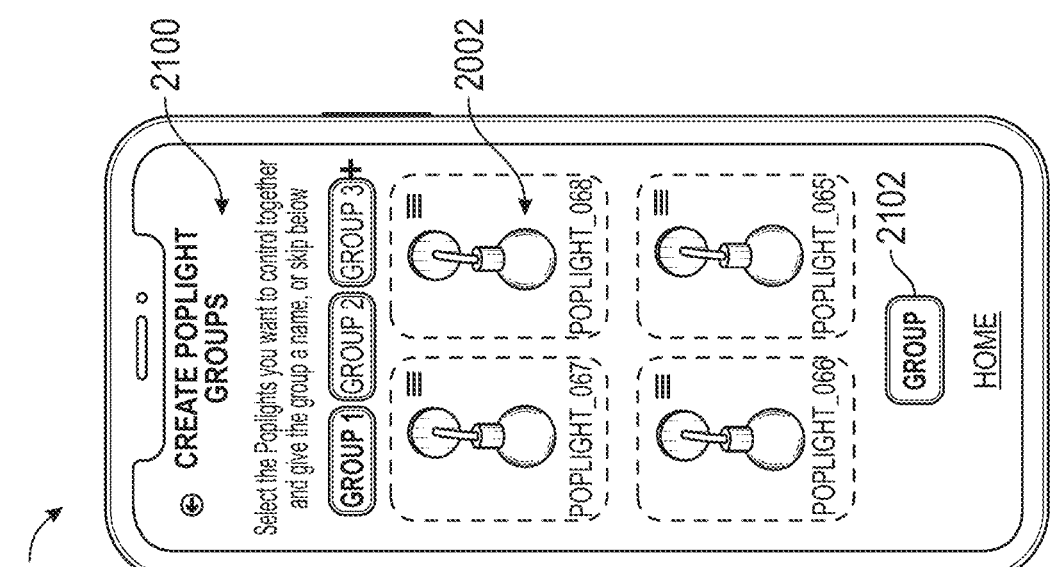
FIG. 30 is an application interface that may be used to create groups of lights, for use with the control system of FIG. 19A.
Figure 29:
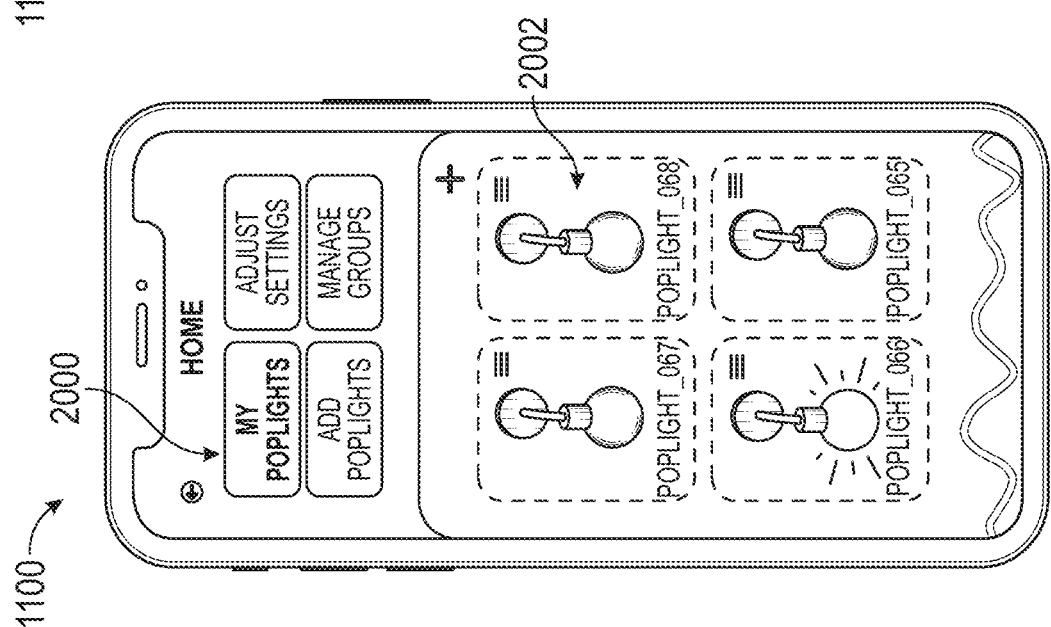
FIG. 29 is an application interface that may be used to show a home page with program options, for use with the control system of FIG. 19A.

FIGS. 29-31 in general illustrate the addition of new light fixtures 100 to the application interface 1100. In particular, FIG. 29 is an application interface 1100 that may be used to show a home page with the options 2000 of MY POPLIGHTS, ADJUST SETTINGS, ADD POPLIGHTS and MANAGE GROUPS. In this example, four different moveable light fixtures 2002 have been added, paired or synced with the system. As illustrated in FIG. 29, when choosing the MY POPLIGHTS, the application interface 1100 also displays light fixtures icons 2002 currently connected light fixtures 100 and their status, for example, whether the light fixtures 100 are on or off.

FIG. 30 is an application interface 1100 that may be used to create groups of lights. In this example, GROUP 1, GROUP 2 and GROUP 3 are shown and GROUP 1 is selected. When selecting GROUP 1, the screen shows the four moveable light fixtures icons 2002 representing four connected light fixtures 100 organized under GROUP 1. The same light fixtures 100 may be organized and placed in the different groups as desired by pressing the GROUP icon 2102.

FIG. 31 is an application interface 1100 that may be used to display the menu items MY POPLIGHTS, ADJUST SETTINGS, ADD POPLIGHTS and MANAGE GROUPS and show that no moveable light fixtures have been added. FIG. 31 further shows the screen display when no light fixture 100 has been connected to the application and control device. Unlike shown in FIG. 29, here, no light fixture icon is displayed. Instead, the application interface 1100 will show NO POPLIGHTS YET along with an adding icon 2200. An ADD POPLIGHT BAR is also presented, to provide the user with a button for the application interface 1100 in FIGS. 26-28.

Figure 32:
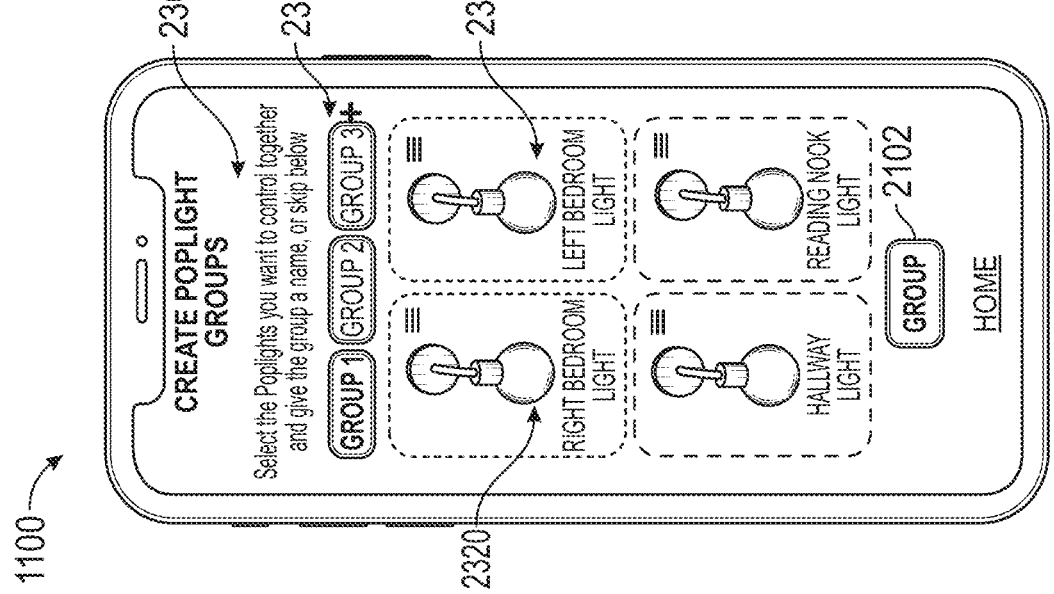
FIG. 32 is an application interface that may be used to create one or more groups of lights, with each group containing one or more moveable light fixtures, for use with the control system of FIG. 19A.

FIGS. 32-36 in general illustrate an application interface 1100 for grouping light fixtures 100. In particular, FIG. 32 is an application interface 1100 that may be used to create one or more groups of lights 2320, with each group 2310 containing one or more moveable light fixtures. To group light fixtures 100, a user will first select the desired group by tapping the group icon 2310. The user may then select the desired light fixtures 100 by long-pressing the displayed light fixtures icon 2320. Once the desired light fixtures are selected, the light fixtures may then be grouped under the desired group by pressing the GROUP icon 2102.

Figure 33:
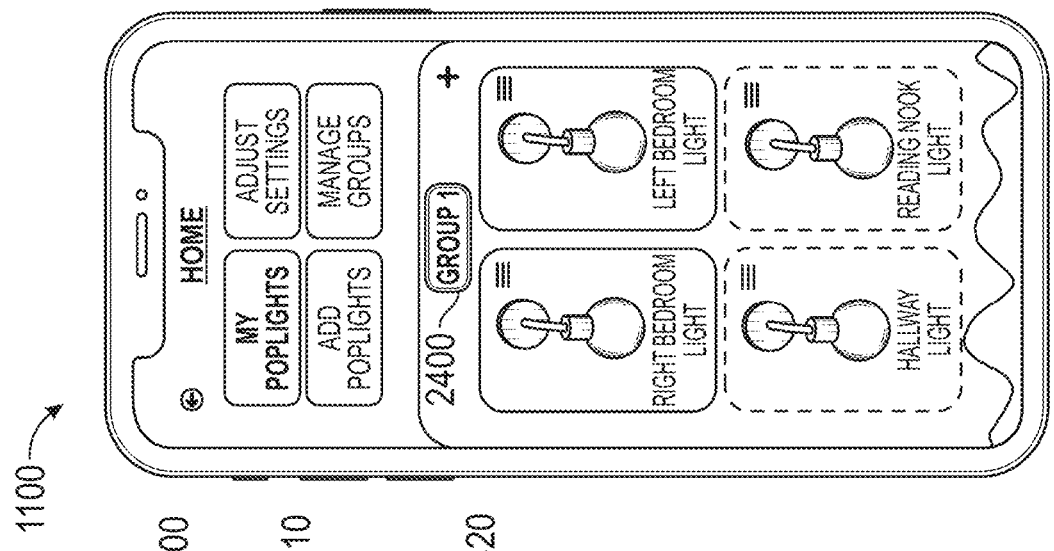
FIG. 33 is an application interface that may be used to show a home page showing different groups of moveable light fixtures, for use with the control system of FIG. 19A.

After grouping the light fixtures, a user may check which light fixtures 100 are under certain groups at any time through the application interface 1100 by tapping MY POPLIGHT, as shown in FIG. 33. By doing so, the application interface 1100 will display the group name 2400 and light fixtures icons representing each connected light fixtures 100 organized in this group. In the illustrated example in FIG. 32, GROUP 1 is selected, and there are four light fixtures are currently grouped under GROUP 1.

Figure 34:
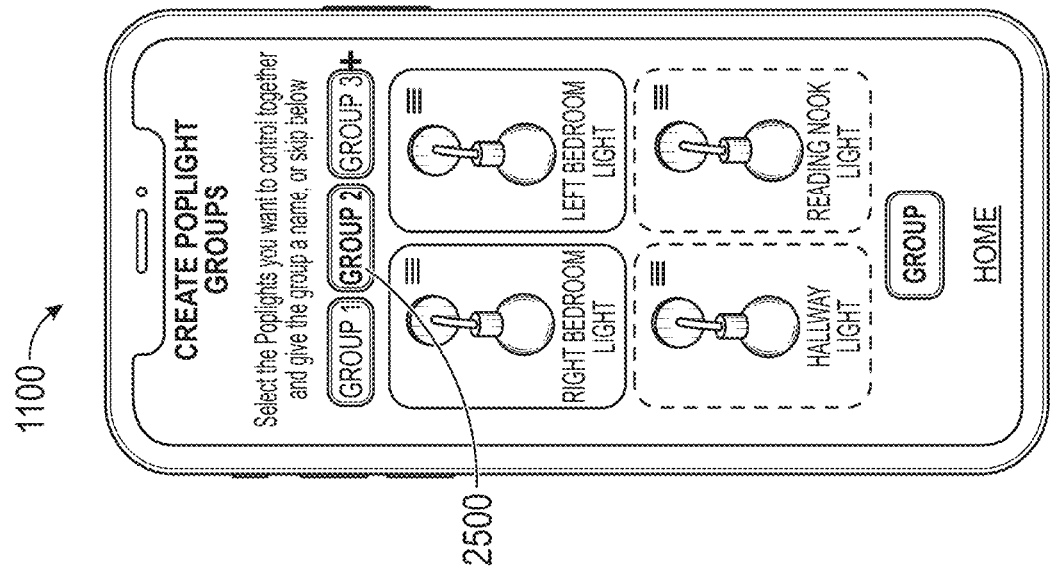
FIG. 34 is an application interface that may be used to create additional groups of moveable light fixtures, for use with the control system of FIG. 19A.
Figure 36:
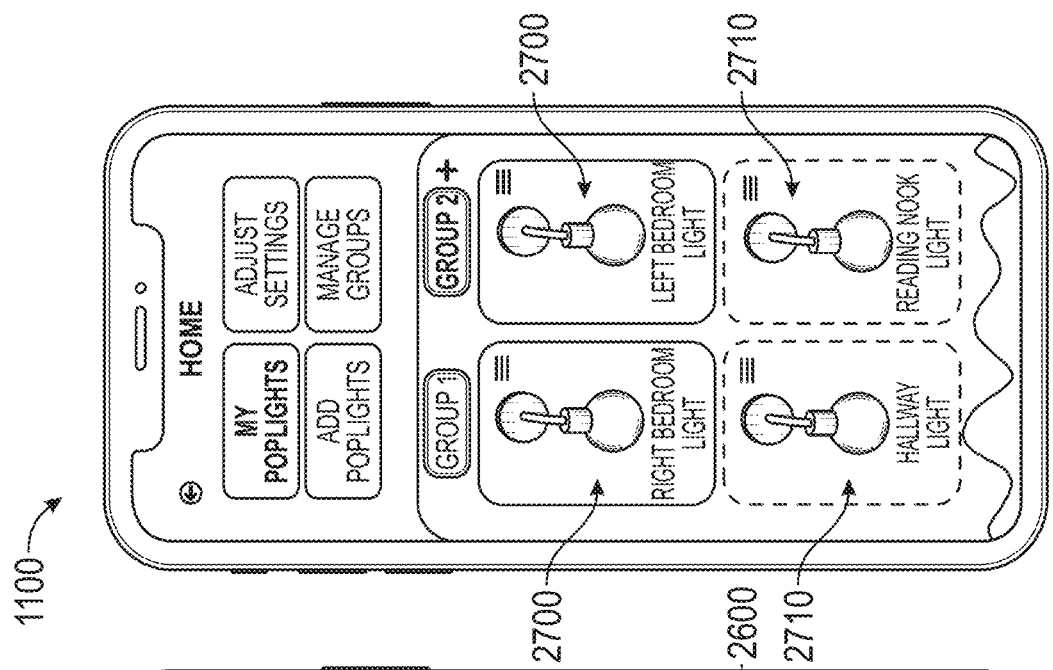
FIG. 36 is an application interface that may be used to show a home page that illustrates a plurality of groups of lights, with each group containing a plurality of moveable light fixtures, for use with the control system of FIG. 19A.
Figure 35:
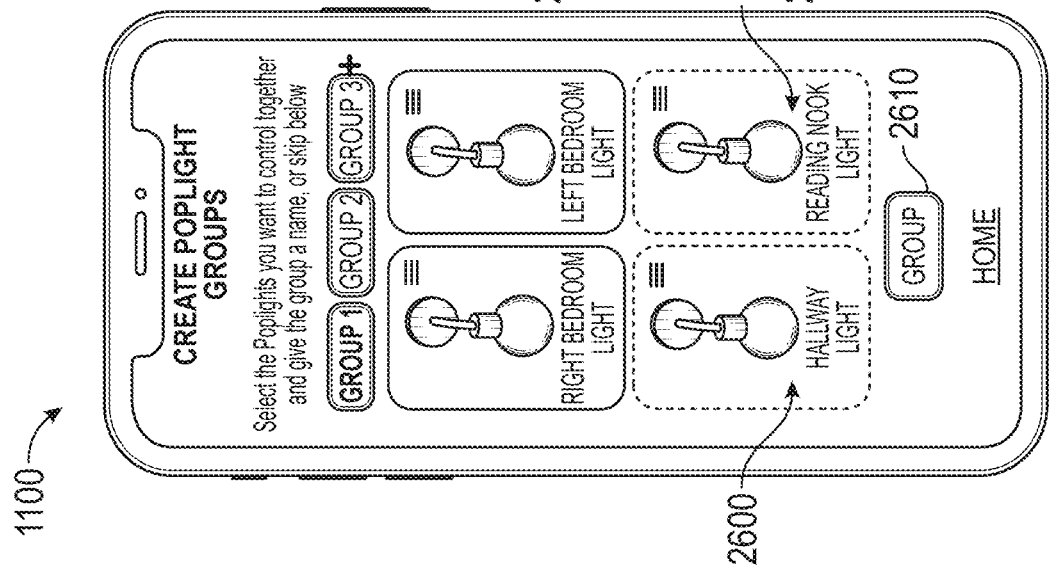
FIG. 35 is an application interface that may be used to create a second group of moveable light fixtures, for use with the control system of FIG. 19A.

Similar to the process described above, a user can create more than one group by repeating the steps described in FIG. 32. FIGS. 34-36 are examples illustrating an application interface 1100 that may be used to create additional groups 2500 and 2600 of moveable light fixtures. In FIG. 3, the GROUP icon 2610 may be pressed to select additional groups of one or more lights to be grouped together. When there is more than one group created by a user, the home page of the application interface 1100 may display more than one group. FIG. 36, for example, is an application interface 1100 shows a home page that illustrates a plurality of groups of lights, with each group containing a plurality of moveable light fixtures. Specifically in this example, GROUP 1 includes the moveable light fixtures named RIGHT BEDROOM LIGHT and LEFT BEDROOM LIGHT, while GROUP 2 includes the moveable light fixtures named HALLWAY LIGHT AND READING NOOK LIGHT. When selecting one of the groups, the application interface 1100 will optionally show the light fixtures under the group with corresponding light fixture icons in a darker color than the light fixture icons representing light fixtures out of the selected group.

Figure 37:
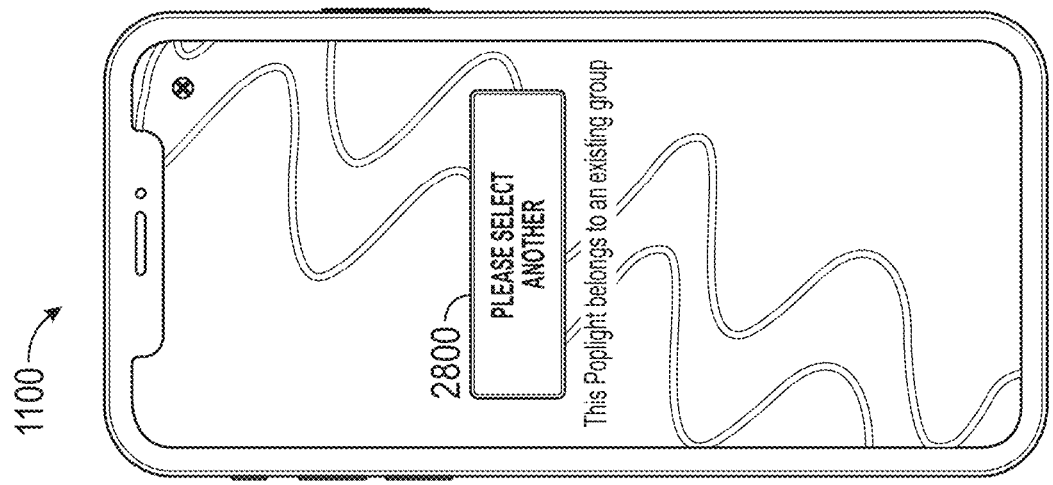
FIG. 37 is an application interface that may be used to show an error message when a moveable light fixture is selected for a group when the moveable light fixture is already in a different group of moveable light fixtures, for use with the control system of FIG. 19A.

FIG. 37 is an application interface 1100 that may be used to show an error message when a moveable light fixture is selected for a first group 2700 when the moveable light fixture is already in a different second group 2710 of moveable light fixtures. The application interface 1100 will further prompt the user to select another light fixture.

Figure 40:
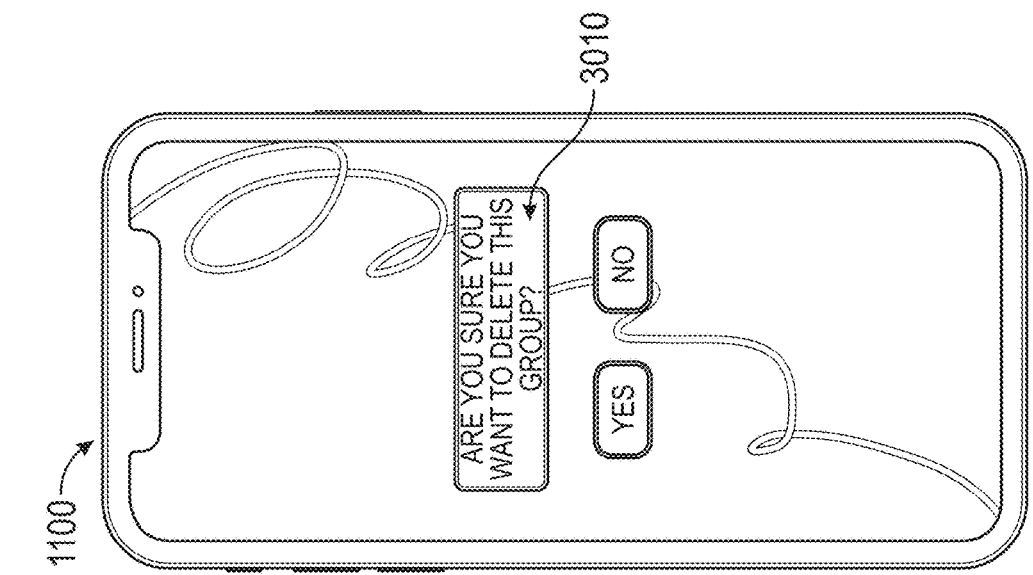
FIG. 40 is an application interface that may be used to make certain that the user wants to delete a group of moveable light fixtures, for use with the control system of FIG. 19A.
Figure 39:
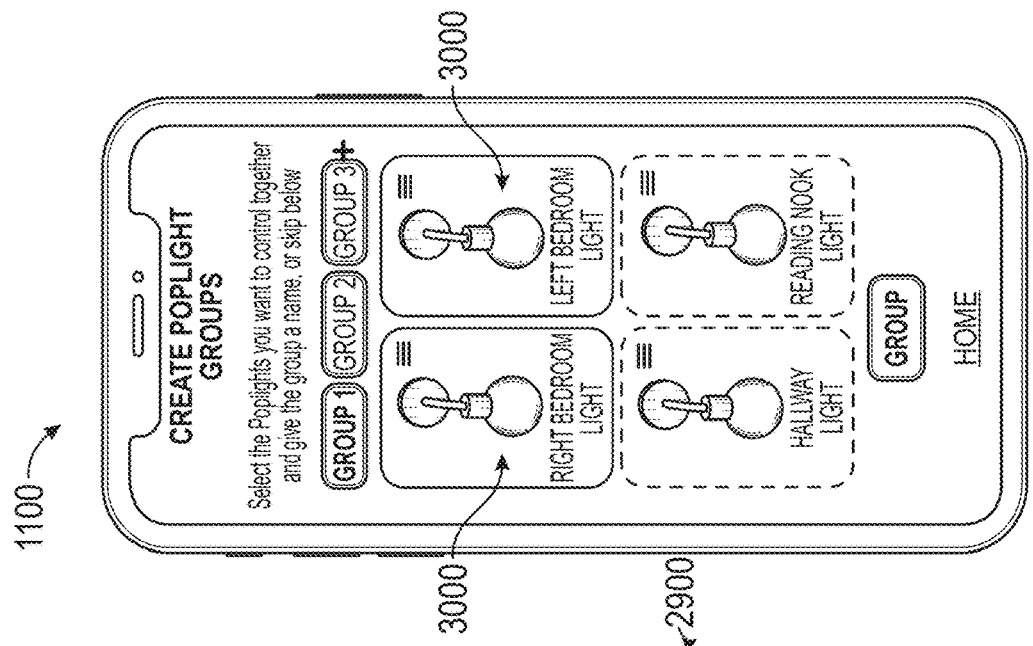
FIG. 39 is an application interface that may be used to group moveable light fixtures and give the group of moveable light fixtures a name, for use with the control system of FIG. 19A.
Figure 38:
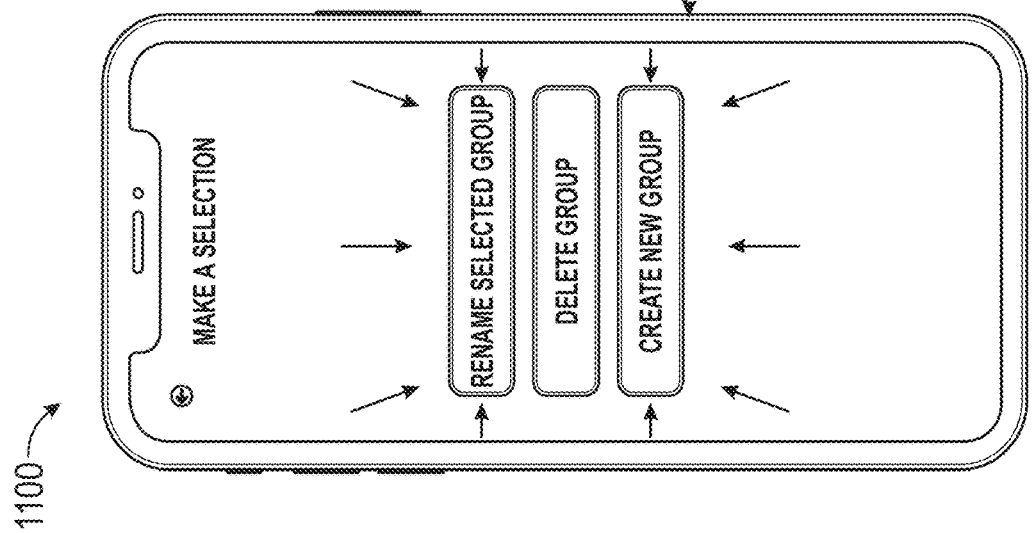
FIG. 38 is an application interface that may be used to provide grouping options, for use with the control system of FIG. 19A.

A user may further manage the existing group through the application. FIG. 38-43 illustrates an application interface 1100 providing options by providing varies group managing icons 2900 of RENAME SELECTED GROUP, DELETE GROUP or CREATE NEW GROUP. In particular, FIG. 39 is an application interface 1100 that may be used to group moveable light fixtures into a group 3000 and give the group of moveable light fixtures a name. FIG. 40 is an application interface 1100 that may display a text 3010 that may be used to make certain that the user wants to delete a group of moveable light fixtures.

FIGS. 41-42 illustrate an application interface 1100 that may have a field 3200 to be used to enter a name 3300 for a moveable light fixture or a group of moveable light fixtures. Once the desired name is entered, the name may be saved by tapping the SAVING button. A BACK button is also displayed and a user may return to the home page by tapping the BACK button from the name changing interface.

Figure 46:
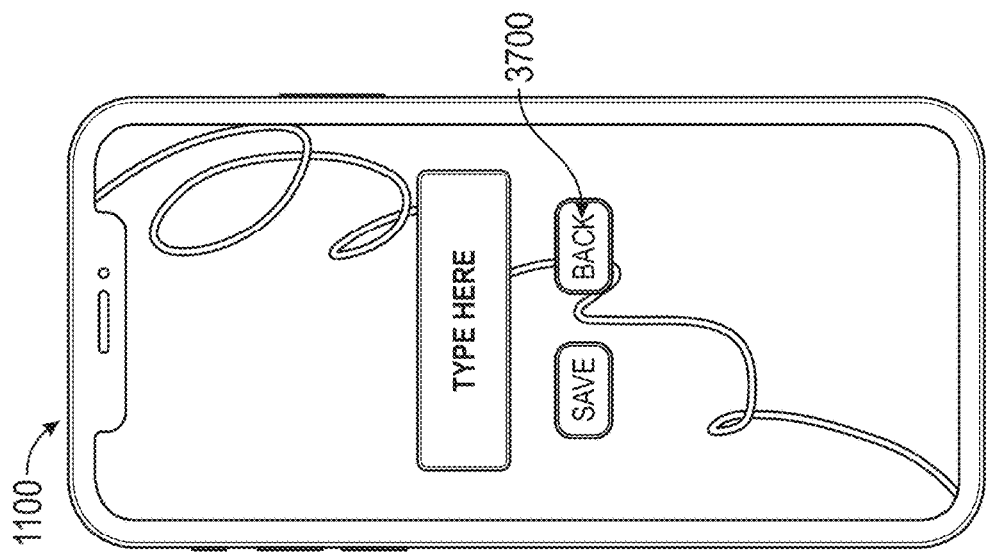
FIG. 46 is an application interface that may be used to enter the name of a moveable light fixture or a group of moveable light fixtures, for use with the control system of FIG. 19A.
Figure 45:
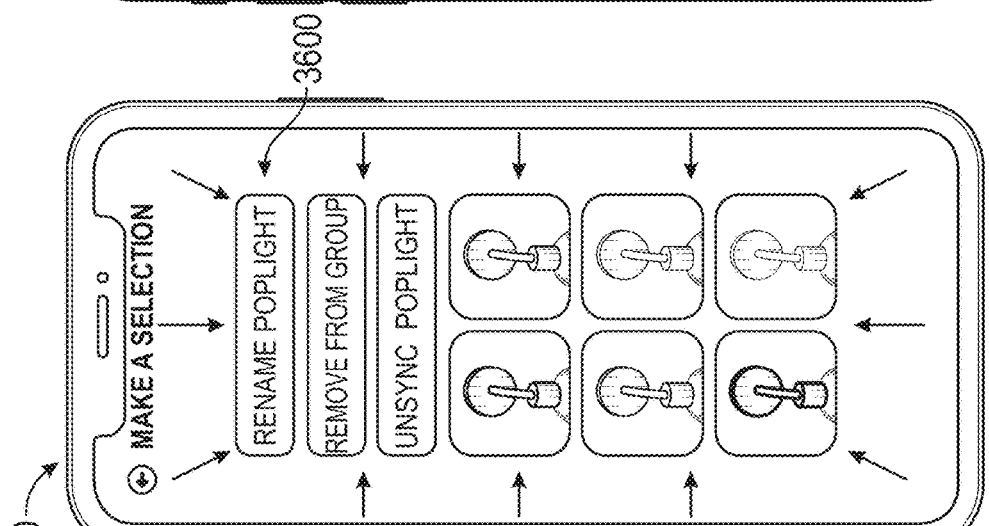
FIG. 45 is an application interface that may be used to provide grouping options, for use with the control system of FIG. 19A.
Figure 44:
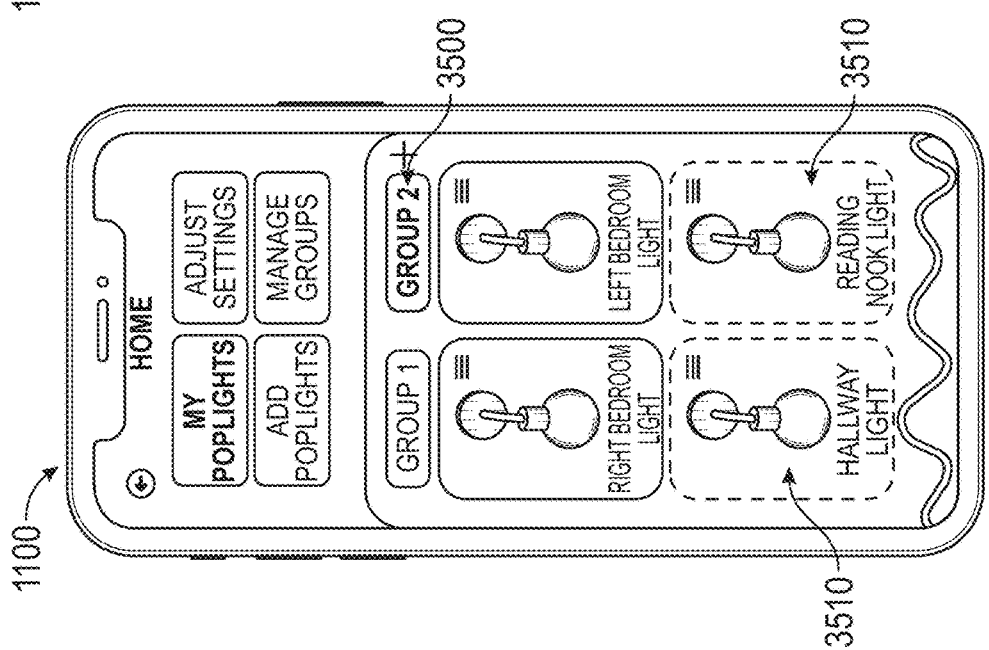
FIG. 44 is an application interface that may be used to display groups of moveable light fixtures and provide grouping options, for use with the control system of FIG. 19A.
Figure 48:
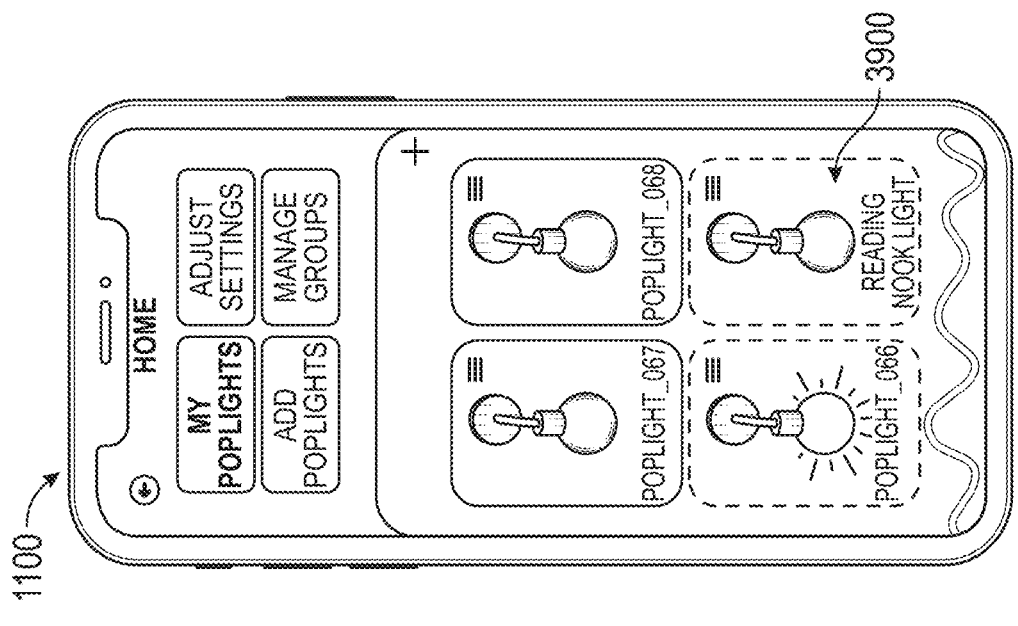
FIG. 48 is an application interface that may be used to display the grouping options and lighting fixture status, for use with the control system of FIG. 19A.
Figure 47:
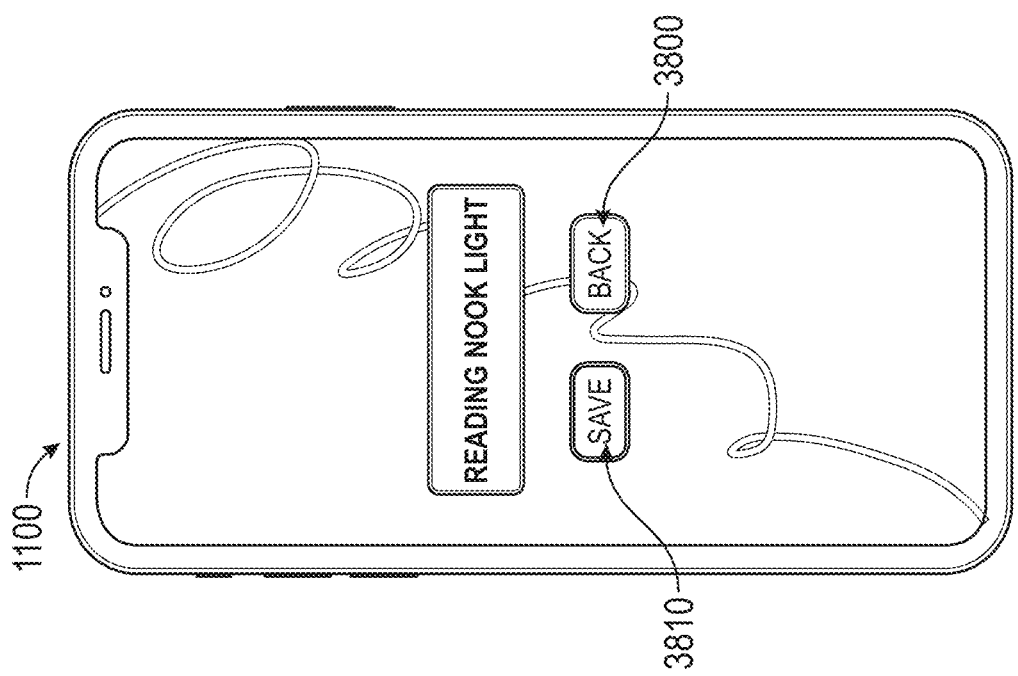
FIG. 47 is an application interface that may be used to save or go back after entering a name for a light or a group of moveable light fixtures, for use with the control system of FIG. 19A.

FIG. 43 shows the application interface 1100 with a customized group name. Here, the application interface 1100 is displaying several groups including Group HALLWAY, which is a customized name for the group. The interface further highlights that the Group Hallway currently having two connected light fixtures: the HALLWAY LIGHT and the READING NOOK LIGHT. FIG. 44-48 is an application interface 1100 that may be used to display groups 3500, 3510 of moveable light fixtures and provide the options of MY POPLIGHTS, ADJUST SETTINGS, ADD POPLIGHTS and MANAGE GROUPS. In particular, FIGS. 45-48 illustrate the light fixture management function of the application. Specifically, FIG. 45 shows multiple selections for light fixture management, including the light fixture rename function. FIGS. 46-47 illustrate the application interface 1100 showing the name entering and saving window, and FIG. 48 illustrate the name changing results displaying the new name on the home page.

FIG. 45 is an application interface 1100 that may be used to provide multiple options for users to manage connected light fixtures. In the application interface 1100, there are several selections: RENAME POPLIGHT to rename a light fixture, REMOVE FROM GROUP to remove a specific light fixture 100 from the currently assigned group, and UNSYNC POPLIGHT to disconnect a light fixture 100 from the application and the control device. Also as illustrated in FIG. 45, including at least with the bottom-left lighting fixture, where the lighting element in the lighting fixture is a LED that is color-controllable via the application interface 1100, the application interface 1100 may illustrate the particular color of the lighting element in communication with the application interface 1100.

FIG. 46 is an application interface 1100 that may be used to enter the name of a moveable light fixture or a group of moveable light fixtures in a field 3700. Once a desired name is entered in the field 3700, the name can be saved by clicking the SAVE button (shown in FIG. 47). After the name is saved, a user may exit the name changing page by clicking BACK button. In the example embodiment, the name of the selected light fixture is changed to READING NOOK LIGHT.

FIG. 48 illustrates how the application interface 1100 shows the changed name in the home page. In the example embodiment, after the name of the light fixture being changed to READING NOOK LIGHT, the same text is displayed under the corresponding light fixture icon in the home page.

Figure 50:
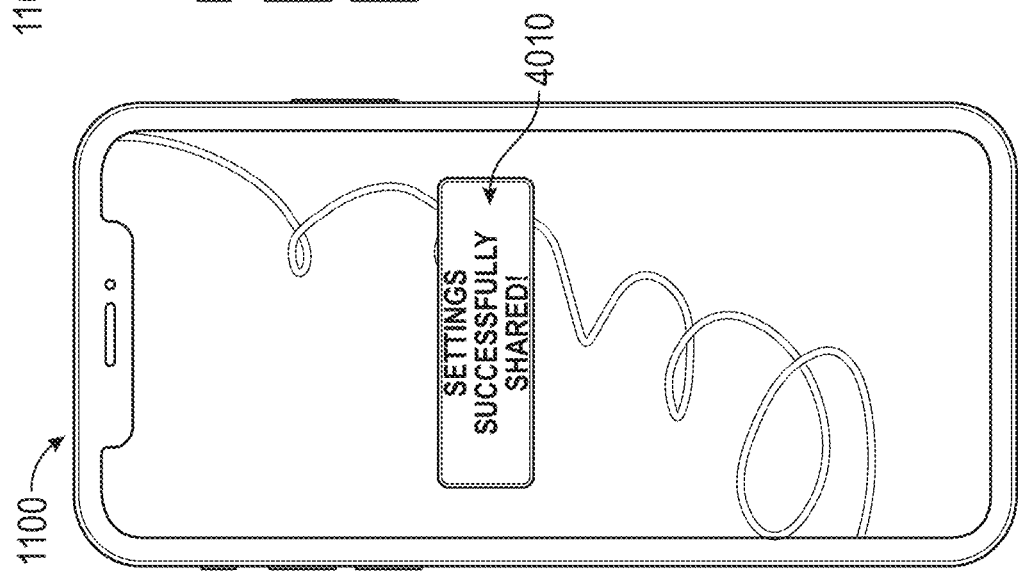
FIG. 50 is an application interface that may be used to share settings with another electronic device, for use with the control system of FIG. 19A.
Figure 49:
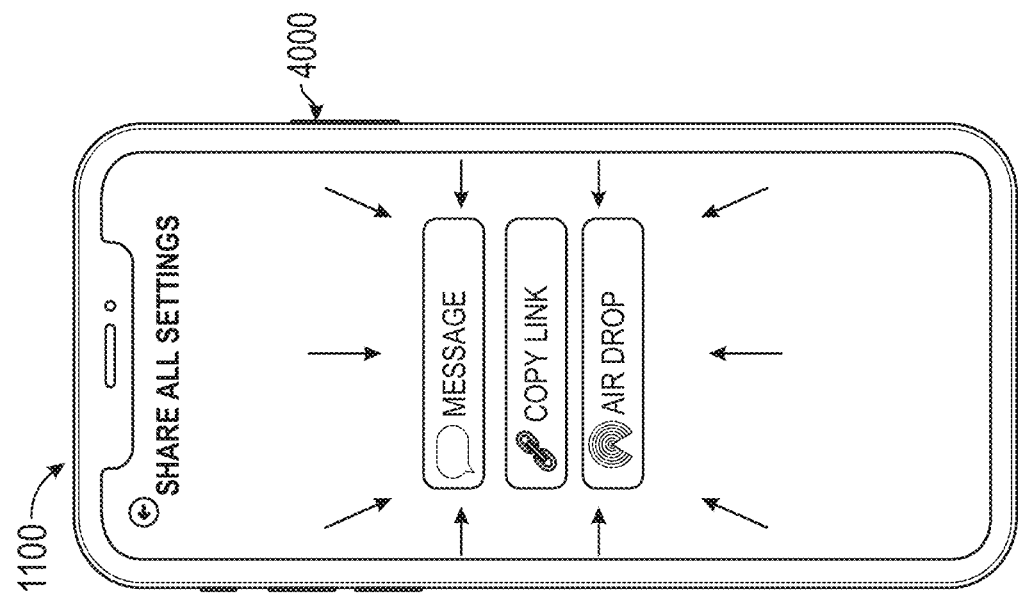
FIG. 49 is an application interface that may be used to share settings with another electronic device, for use with the control system of FIG. 19A.

FIGS. 49-50 in general illustrate the sharing of setting between controllers 216 and application interfaces 1100. In particular, FIG. 49 is an application interface 1100 with a menu 4000 that may be used to share settings with another controller 216 (e.g., such as a smart phone) via a button representing MESSAGE, COPY LINK or AIR DROP protocols. In embodiments, the controller 216 pulls information from memory 220 (e.g., from contact lists, or the like) to populate a field that is provided when the MESSAGE button is selected. Alternatively, the user may populate the provided field with keyboard inputs or the like. In additional embodiments, the controller 216 may create and save a file for access when the COPY LINK button is selected. Alternatively, the controller 216 may provide a list of messaging or communication apps on the controller 216 in which the link can be shared.

Figure 51:
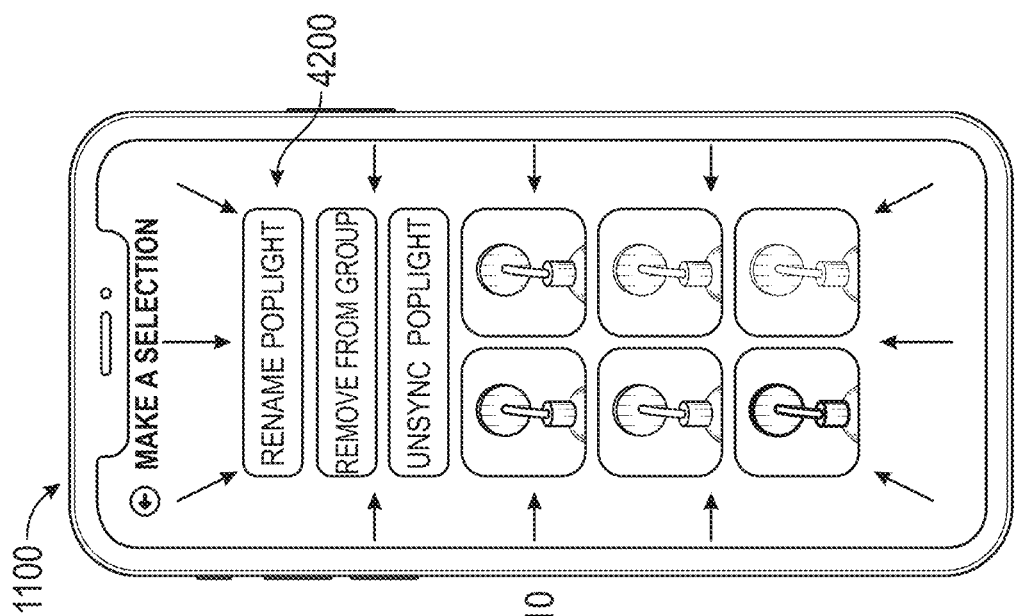
FIG. 51 is an application interface that may be used to provide grouping options, for use with the control system of FIG. 19A.

FIGS. 51-54 in general illustrate unsyncing of a light fixture 100 from the application interface 1100. In particular, FIG. 51 is an application interface 1100 that may be used to provide the options of RENAME POPLIGHT, REMOVE FROM GROUP and UNSYNC POPLIGHT in a menu 4200.

FIG. 52-53 illustrate another light fixture management function to unsync a moveable light fixture. Specifically, FIG. 52 displays an application interface 1100 with a confirmation window 4300 to confirm whether the user wants to unsync a selected light fixture. Two options, YES and NO, are displayed under the confirmation window 4300. By pressing the YES button, the light fixture 100 will be disconnected and unsynced from the application interface 1100 and the controller 216. Subsequently, a prompt 4400 as shown in FIG. 53 will be displayed on the application interface 1100 to confirm that the light fixture has been successfully unsynced. In the illustrated example, the prompt 4400 including text POPLIGHT SUCCESSFULLY UNSYNCED. If the NO button is pressed, however, the application interface 1100 will automatically go back to the light fixtures management menu 4200.

FIG. 54 is an application interface 1100 that may be used to provide the options of MY POPLIGHTS, ADJUST SETTINGS, ADD POPLIGHTS and MANAGE GROUPS while also displaying one or more groups of moveable light fixtures with one or more moveable light fixtures. In this example, the BEDROOM group 4500 is selected and the moveable light fixtures in the BEDROOM group are displayed.

It should be understood that any solid lines (or optionally broken lines to show a particular selection being made) as illustrated in FIGS. 1A-54 may be converted to broken lines for purposes of illustrating environment. In one non-limiting example, the components of (and/or the entirety of) the base 102, the optional arm 104, the light shade 110, and/or the battery 111 may be illustrated in broken lines representing environment, without departing from the scope of the present disclosure.

Embodiments of the present disclosure have been described with reference to various specific and preferred embodiments and techniques. Nevertheless, it is understood that many variations and modifications may be made while remaining within the spirit and scope of embodiments of the present disclosure.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as additional items. Further, it is to be understood that the claims are not necessarily limited to the specific features or steps described herein. Rather, the specific features and steps are disclosed as embodiments of implementing the claimed systems and methods.

One aspect of the disclosure comprises any one or more of the aspects/embodiments as substantially disclosed herein.

Another aspect of the disclosure is any one or more of the aspects/embodiments as substantially disclosed herein optionally in combination with any one or more other aspects/embodiments as substantially disclosed herein.

It is another aspect of the present disclosure to provide one or more means adapted to perform any one or more of the above aspects/embodiments as substantially disclosed herein.

What is claimed is:

1. A moveable light fixture, comprising:
   a base including a housing and a plate that is positionable on a surface of a wall;
   a battery that is installable in and removable from the housing of the base; a circuit board operable to control a lighting element that extends from the base, wherein the circuit board is installed in the battery; and
   one or more adhesive strips, wherein a first side of the one or more adhesive strips is configured to be attached to a rear side of the plate, wherein a second side of the one or more adhesive strips is configured to be attached to the surface of the wall, and
   wherein a tail end of each of the one or more adhesive strips is positioned in a notch of the plate when the plate is attached to the surface of the wall.

2. The moveable light fixture of claim 1, wherein the circuit board is in communication with a controller via respective transmission and receiving (Tx/Rx) units, wherein the moveable light fixture has a unique identification code, and wherein the controller is operable to control the moveable light fixture based on the unique identification code.

3. The moveable light fixture of claim 2, wherein the moveable light fixture is controllable via an application interface on the controller that is executed by processors and stored on memory in the controller.

4. The moveable light fixture of claim 1, wherein the battery is rechargeable.

5. The moveable light fixture of claim 1, wherein the battery includes a charging port.

6. The moveable light fixture of claim 1, wherein an indicator light is in communication with the battery to provide an indication of charge status of the battery.

7. The moveable light fixture of claim 1, wherein the housing includes a battery slot, and wherein the battery includes a clip that secures the battery within the battery slot.

8. The moveable light fixture of claim 1, wherein the battery includes an exterior surface that is contoured to conform to an exterior surface of the housing.

9. A moveable light fixture comprising:
   a base including a housing and a plate that is positionable on a surface of a wall, wherein the housing is couplable to and removable from the plate via an interlocking assembly that engages when the housing is rotated with respect to the plate, and wherein the plate includes a notch at a distal end of the plate;
   a light shade extending from the base, the light shade including a lighting element; and
   one or more adhesive strips, wherein a first side of the one or more adhesive strips is configured to be attached to a rear side of the plate, wherein a second side of the one or more adhesive strips is configured to be attached to the surface of the wall, and
   wherein a tail end of each of the one or more adhesive strips is accessible through the notch of the plate when the plate is attached to the surface of the wall.

10. The moveable light fixture of claim 9, wherein the plate includes one or more raised surfaces for receiving at least a portion of the one or more adhesive strips.

11. The moveable light fixture of claim 10, wherein a width of the one or more raised surfaces is substantially equal to a width of the one or more adhesives strips, and a length of the one or more raised surfaces is less than a length of the one or more adhesive strips.

12. The moveable light fixture of claim 9, wherein the tail end of each of the one or more adhesive strips is exposed in the notch when the housing is removed from the plate.

13. The moveable light fixture of claim 9, wherein the tail end of each of the one or more adhesive strips are covered in the notch by the housing when the housing is attached to the plate.

14. The moveable light fixture of claim 10, wherein a width of the notch is substantially equal to a distance between a first outer edge of the one or more raised surfaces and a second outer edge of the one or more raised surfaces, and wherein a height of the notch is substantially equal to or less than a length of the tail end of each of the one or more adhesive strips.

15. The moveable light fixture of claim 9, wherein the one or more adhesive strips comprises two double sided adhesive strips, and wherein both tail ends of the two double sided adhesive strips are accessible through the notch of the plate.

16. The moveable light fixture of claim 9, further comprising an arm extending from a first end to a second end, wherein the arm is coupled to the base at the first end, and wherein the light shade is coupled to the arm at the second end.

17. The moveable light fixture of claim 9, further comprising a collar, wherein a neck of the light shade couples to the collar via a second interlocking assembly.

18. The moveable light fixture of claim 9, further comprising a diffuser proximate to the lighting element within the light shade, wherein the diffuser couples to the light shade via a second interlocking assembly.

19. A control system for a battery-powered device, comprising:
   at least one moveable light fixture, each of the at least one moveable light fixture comprising:

a base including a housing that is couplable to a plate positioned on a surface of a wall, wherein a lighting element is coupled to the base;

a battery that is insertable in and removable from the housing, the battery comprising a circuit board that generates a unique identification code for a respective moveable light fixture and a first transmission and receiving (Tx/Rx) unit, wherein the circuit board is operable to control the lighting element; and one or more adhesive strips, wherein a first side of the one or more adhesive strips is configured to be attached to a rear side of the plate, and wherein a second side of the one or more adhesive strips is configured to be attached to the surface of the wall; and a controller including a second transmission and receiving (Tx/Rx) unit, wherein the second Tx/Rx unit of the controller is in communication with the first Tx/Rx unit in the battery, and wherein the controller is operable to control the lighting element of the respective moveable light fixture based on the unique identification code.

* * * * *